(12) United States Patent
Shahana et al.

(10) Patent No.: US 11,358,678 B2
(45) Date of Patent: Jun. 14, 2022

(54) CONTROL SYSTEM FOR HUMAN-POWERED VEHICLE

(71) Applicant: Shimano Inc., Osaka (JP)

(72) Inventors: Satoshi Shahana, Osaka (JP); Noriko Masuta, Osaka (JP); Azusa Yamazaki, Osaka (JP); Megumi Nakabo, Osaka (JP); Takehiko Nakajima, Osaka (JP); Fumihide Numata, Osaka (JP); Hiroshi Fujita, Osaka (JP); Kenji Goto, Osaka (JP)

(73) Assignee: Shimano Inc., Osaka (JP)

( * ) Notice: Subject to any disclaimer, the term of this patent is extended or adjusted under 35 U.S.C. 154(b) by 398 days.

(21) Appl. No.: 16/662,720

(22) Filed: Oct. 24, 2019

(65) Prior Publication Data

US 2020/0130778 A1    Apr. 30, 2020

(30) Foreign Application Priority Data

Oct. 31, 2018 (JP) .............................. JP2018-204690

(51) Int. Cl.
| | |
|---|---|
| *B62M 9/122* | (2010.01) |
| *B62M 9/132* | (2010.01) |
| *B62K 27/10* | (2006.01) |
| *B62M 25/08* | (2006.01) |
| *B62J 99/00* | (2020.01) |
| *B62M 6/45* | (2010.01) |
| *B62M 6/55* | (2010.01) |

(Continued)

(52) U.S. Cl.
CPC .............. *B62M 9/122* (2013.01); *B62J 99/00* (2013.01); *B62K 27/10* (2013.01); *B62M 6/45* (2013.01); *B62M 6/55* (2013.01); *B62M 9/132* (2013.01); *B62M 25/08* (2013.01); *B62J 45/00* (2020.02); *B62J 45/40* (2020.02)

(58) Field of Classification Search
CPC .......... B62M 6/45; B62M 6/50; B62M 9/122; B62M 9/132; B62M 25/08; B60L 2200/12; B62J 43/13; B62J 45/00; B62J 45/40; B62K 27/003; B62K 27/10
USPC .......................................................... 474/70
See application file for complete search history.

(56) References Cited

U.S. PATENT DOCUMENTS 2,409,887 A * 10/1946 Murphy ................... B62M 7/10
                                                                180/205.7
2,578,886 A * 12/1951 Isherwood ............. B62M 13/04
                                                                180/221

(Continued)

FOREIGN PATENT DOCUMENTS

| DE | 102 424 47 A1 | 3/2004 |
|---|---|---|
| JP | 10-511621 A | 11/1998 |

(Continued)

*Primary Examiner* — Henry Y Liu
(74) *Attorney, Agent, or Firm* — Global IP Counselors, LLP

(57) ABSTRACT

A control system includes a detection device and an electronic controller. The detection device is configured to detect passenger information related to at least one passenger of a human-powered vehicle driven by a driver of the human-powered vehicle in which the at least one passenger is different from the driver. The electronic controller is configured to control at least one component of the human-powered vehicle in accordance with the passenger information.

23 Claims, 10 Drawing Sheets

(51) Int. Cl.
*B62J 45/00* (2020.01)
*B62J 45/40* (2020.01)

(56) References Cited

U.S. PATENT DOCUMENTS

| | | | | |
|---|---|---|---|---|
| 4,227,589 A * | 10/1980 | Chika | | B62M 6/10 |
| | | | | 280/283 |
| 9,114,851 B2 * | 8/2015 | Schneider | | B62K 9/02 |
| 10,071,788 B1 * | 9/2018 | Lee | | B62K 23/02 |
| 2002/0038730 A1 * | 4/2002 | Bidwell | | B62M 7/16 |
| | | | | 180/15 |
| 2008/0023234 A1 * | 1/2008 | Wang | | B62M 7/14 |
| | | | | 280/204 |
| 2010/0032925 A1 * | 2/2010 | Ehrenreich | | B62B 7/126 |
| | | | | 280/648 |
| 2010/0096197 A1 * | 4/2010 | Stoddart | | B62M 7/16 |
| | | | | 280/481 |
| 2010/0206652 A1 * | 8/2010 | Kielland | | B62K 3/005 |
| | | | | 180/220 |
| 2013/0076005 A1 * | 3/2013 | McDade | | B62B 1/20 |
| | | | | 280/47.26 |
| 2016/0318575 A1 * | 11/2016 | Shimoda | | B62L 3/023 |
| 2016/0325640 A1 * | 11/2016 | Craven | | B62M 6/45 |
| 2017/0057596 A1 * | 3/2017 | Ichida | | B62M 6/70 |
| 2017/0183056 A1 * | 6/2017 | Yamamoto | | B62M 6/50 |
| 2017/0203814 A1 * | 7/2017 | Kurokawa | | B62M 25/08 |
| 2017/0217538 A1 * | 8/2017 | Yamamoto | | B62M 11/145 |
| 2017/0297651 A1 * | 10/2017 | Tsuchizawa | | B60W 10/11 |
| 2017/0341705 A1 * | 11/2017 | Tsuchizawa | | B62M 6/55 |
| 2017/0355420 A1 * | 12/2017 | Tsuchizawa | | B62M 6/50 |
| 2018/0050761 A1 * | 2/2018 | Tsuchizawa | | B62M 6/45 |
| 2018/0118305 A1 * | 5/2018 | Tsuchizawa | | B62M 6/45 |
| 2018/0170472 A1 * | 6/2018 | Como | | B62J 45/414 |
| 2018/0215432 A1 * | 8/2018 | Tsuchizawa | | B62M 25/08 |
| 2018/0257743 A1 * | 9/2018 | Tsuchizawa | | B62J 45/415 |
| 2018/0362115 A1 * | 12/2018 | Tsuchizawa | | B62M 6/50 |
| 2019/0009859 A1 * | 1/2019 | Komatsu | | B62M 6/45 |
| 2019/0118670 A1 * | 4/2019 | Vallier | | B60L 15/42 |
| 2019/0241234 A1 * | 8/2019 | Hattori | | B62M 6/45 |
| 2020/0298809 A1 * | 9/2020 | Todeschini | | B60T 8/17551 |
| 2020/0391709 A1 * | 12/2020 | Brütt | | B60T 8/176 |
| 2020/0398802 A1 * | 12/2020 | Atsushi | | B60T 8/3685 |
| 2021/0046911 A1 * | 2/2021 | Levi | | B62J 27/00 |

FOREIGN PATENT DOCUMENTS

| | | |
|---|---|---|
| JP | 2008-44565 A | 2/2008 |
| JP | 2011-11608 A | 1/2011 |
| JP | 2011-230529 A | 11/2011 |
| JP | 2015-36271 A | 2/2015 |
| JP | 2015-199428 A | 11/2015 |
| JP | 2016-147669 A | 8/2016 |
| JP | 3212742 U | 9/2017 |

* cited by examiner

CONTROL SYSTEM FOR HUMAN-POWERED VEHICLE

CROSS-REFERENCE TO RELATED APPLICATIONS

This application claims priority to Japanese Patent Application No. 2018-204690, filed on Oct. 31, 2018. The entire disclosure of Japanese Patent Application No. 2018-204690 is hereby incorporated herein by reference.

BACKGROUND

Technical Field

The present invention generally relates to a control system for a human-powered vehicle.

Background Information

A known control device controls a component of a human-powered vehicle. A component includes, for example, a transmission device. A conventional control device controls a transmission device so as to maintain a rotational speed of a crank of a human-powered vehicle in a predetermined range in accordance with a shifting condition that is set based on the rotational speed of the crank and a threshold value. Japanese Laid-Open National Phase Patent Publication No. 10-511621 (Patent document 1 discloses one example of a conventional control device).

SUMMARY

It is desirable that a rider driving a human-powered vehicle be able to travel comfortably. One object of the present disclosure is to provide a control system that allows for comfortable traveling with a human-powered vehicle.

A control system in accordance with a first aspect of the present disclosure comprises a detection device and an electronic controller. The detection device is configured to detect passenger information related to at least one passenger of a human-powered vehicle driven by a driver of the human-powered vehicle in which the at least one passenger is different from the driver. The electronic controller is configured to control at least one component of the human-powered vehicle in accordance with the passenger information.

The control system in accordance with the first aspect controls the component in accordance with the passenger information that affects driving of the human-powered vehicle. This allows for comfortable traveling with the human-powered vehicle.

In accordance with a second aspect of the present disclosure, in the control system according to the first aspect, the electronic controller is configured to change a control mode of the at least one component in accordance with the passenger information.

The control system in accordance with the second aspect allows for comfortable traveling with the human-powered vehicle.

In accordance with a third aspect of the present disclosure, the control system according to the first or second aspect is configured so that the at least one component includes at least one of a transmission device, a suspension, an adjustable seatpost, an electric assist unit, a brake device, and a display.

The control system in accordance with the third aspect controls the component in accordance with the passenger information. This allows for comfortable traveling with the human-powered vehicle.

In accordance with a fourth aspect of the present disclosure, the control system according to any one of the first to third aspects is configured so that the passenger information includes at least one of information related to whether or not the passenger is present, information related to weight of the passenger, and information related to a condition of the passenger.

The control system in accordance with the fourth aspect controls the component in accordance with various types of information included in the passenger information. This allows for comfortable traveling with the human-powered vehicle.

In accordance with a fifth aspect of the present disclosure, the control system according to any one of the first to fourth aspects is configured so that the electronic controller is configured to control the at least one component in accordance with the passenger information related to the at least one passenger seated on at least one passenger seat of the human-powered vehicle.

The control system in accordance with the fifth aspect allows for comfortable traveling with the human-powered vehicle.

In accordance with a sixth aspect of the present disclosure, the control system according to the fifth aspect is configured so that the passenger information includes at least one of information related to a first passenger seated on a first seat of the at least one passenger seat and information related to a second passenger seated on a second seat of the at least one passenger seat.

With the control system in accordance with the sixth aspect, the passenger information includes at least one of information related to the first passenger and information related to the second passenger. Thus, the component can be controlled in accordance with the passenger information. This allows for comfortable traveling with the human-powered vehicle.

In accordance with a seventh aspect of the present disclosure, the control system according to any one of the first to fourth aspects is configured so that the electronic controller is configured to set a designated transmission ratio specifying a transmission ratio of a transmission device of the human-powered vehicle for starting movement of the human-powered vehicle in accordance with the passenger information.

The control system in accordance with the seventh aspect sets the designated transmission ratio in accordance with the passenger information. Thus, the driver can stably start moving the human-powered vehicle. This allows for comfortable traveling with the human-powered vehicle.

In accordance with an eighth aspect of the present disclosure, the control system according to the seventh aspect is configured so that the electronic controller is configured to control a transmission device of the human-powered vehicle as one of the in accordance with the passenger information related to the at least one passenger being seated on at least one passenger seat of the human-powered.

The control system in accordance with the eighth aspect allows for comfortable traveling with the human-powered vehicle.

In accordance with a ninth aspect of the present disclosure, the control system according to the eighth aspect is configured so that the passenger information includes at least one of information related to a first passenger of the at least one passenger seated on a first seat of the at least one passenger seat and information related to a second passenger of the at least one passenger seated on a second seat of the at least one passenger seat in which the first seat is provided frontward from a saddle of the human-powered vehicle and the second seat is provided rearward from the saddle.

With the control system in accordance with the ninth aspect, the passenger information includes at least one of information related to the first passenger and information related to the second passenger. Thus, the transmission device can be controlled in accordance with the passenger information. This allows for comfortable traveling with the human-powered vehicle.

In accordance with a tenth aspect of the present disclosure, in the control system according to the ninth aspect, the electronic controller is configured to set a designated transmission ratio specifying a transmission ratio of a transmission device of the human-powered vehicle so that the designated transmission ratio for starting movement of the human-powered vehicle is less in a case where the first passenger is not seated on the first seat and the second passenger is seated on the second seat than a case where the first passenger is seated on the first seat and the second passenger is not seated on the second seat.

The control system in accordance with the tenth aspect sets the designated transmission ratio in accordance with the presence of the second passenger whose weight easily affects the driver. Thus, the driver can stably start moving the human-powered vehicle. This allows for comfortable traveling with the human-powered vehicle.

In accordance with an eleventh aspect of the present disclosure, the control system according to any one of the first to tenth aspects is configured so that the electronic controller is configured to control a first brake device that brakes a front wheel of the human-powered vehicle in accordance with a first operation and a second brake device that brakes a rear wheel of the human-powered vehicle in accordance with a second operation as the at least one component in accordance with the passenger information to change a relationship between a first ratio of an operation amount of the first operation and a braking force of the first brake device and a second ratio of an operation amount of the second operation and a braking force of the second brake device.

The control system in accordance with the eleventh aspect controls the brake devices so that the relationship of the first ratio and the second ratio changes in accordance with the passenger. Thus, the driver can stably start moving the human-powered vehicle. This allows for comfortable traveling with the human-powered vehicle.

In accordance with a twelfth aspect of the present disclosure, the control system according to the eleventh aspect is configured so that the electronic controller is configured to control the first and second brake devices in accordance with the at least one passenger being seated on at least one passenger seat of the human-powered vehicle.

The control system in accordance with the twelfth aspect allows for comfortable traveling with the human-powered vehicle.

In accordance with a thirteenth aspect of the present disclosure, the control system according to the twelfth aspect is configured so that the passenger information includes at least one of information related to a first passenger of the at least one passenger seated on a first seat and information related to a second passenger of the at least one passenger seated on a second seat in which the first seat is provided frontward from a saddle of the human-powered vehicle and the second seat is provided rearward from the saddlet.

With the control system in accordance with the thirteenth aspect, the passenger information includes at least one of information related to the first passenger and information related to the second passenger. Thus, the brake devices can be controlled in accordance with the passenger information. This allows for comfortable traveling with the human-powered vehicle.

In accordance with a fourteenth aspect of the present disclosure, in the control system according to the thirteenth aspect, the electronic controller is configured to control the first and second brake devices so that the second ratio is greater than the first ratio in a case where the first passenger is seated on the first seat and the second passenger is not seated on the second seat.

The control system in accordance with the fourteenth aspect controls the brake devices so that the second ratio is greater than the first ratio in a case where the first passenger is present. Thus, the driver can stably start moving the human-powered vehicle. This allows for comfortable traveling with the human-powered vehicle.

In accordance with a fifteenth aspect of the present disclosure, in the control system according to the thirteenth or fourteenth aspect, the electronic controller is configured to control the first and second brake devices so that the first ratio is greater than the second ratio in a case where the first passenger is not seated on the first seat and the second passenger is seated on the second seat.

The control system in accordance with the fifteenth aspect controls the brake devices so that the first ratio is greater than the second ratio in a case where the second passenger is present. Thus, the driver can stably start moving the human-powered vehicle. This allows for comfortable traveling with the human-powered vehicle.

In accordance with a sixteenth aspect of the present disclosure, the control system according to any one of the first to fifteenth aspects is configured so that the electronic controller is configured to control an electric assist unit of the human-powered vehicle so as to increase an assist force assisting in propulsion of the human-powered vehicle in accordance with a detected weight of the at least one passenger as the passenger information detected by the detection device in a case where the detected weight of the at least one passenger is greater than or equal to a first predetermined weight.

The control system in accordance with the sixteenth aspect controls the electric assist unit so that the assist force is in accordance with the weight of the passenger. This allows for comfortable traveling with the human-powered vehicle.

In accordance with a seventeenth aspect of the present disclosure, the control system according to any one of the first to sixteenth aspects is configured so that the electronic controller is configured to control an electric assist unit of the human-powered vehicle so as to decrease an assist force assisting in propulsion of the human-powered vehicle in accordance with a detected weight of the at least one passenger as the passenger information detected by the detection device in a case where the detected weight of the at least one passenger is less than a second predetermined weight.

The control system in accordance with the seventeenth aspect controls the electric assist unit so that the assist force is in accordance with the weight of the passenger. This allows for comfortable traveling with the human-powered vehicle.

In accordance with an eighteenth aspect of the present disclosure, the control system according to any one of the first to seventeenth aspects is configured so that the electronic controller is configured to restrict actuation of the at least one component in accordance with a detected motion of the passenger as the passenger information detected by the detection device in a case where the detected motion of the at least one passenger is greater than or equal to a predetermined motion.

The control system in accordance with the eighteenth aspect restricts actuation of the component in accordance with the motion of the passenger. Thus, the driver can stably drive the human-powered vehicle. This allows for comfortable traveling with the human-powered vehicle.

In accordance with a nineteenth aspect of the present disclosure, the control system according to any one of the first to eighteenth aspects is configured so that the electronic controller is configured to restrict actuation of the component in accordance with a detected sleep related condition of the at least one passenger as the passenger information as detected by the detection device.

The control system in accordance with the nineteenth aspect restricts actuation of the component in accordance with sleep of the passenger. Thus, the driver can stably drive the human-powered vehicle. This allows for comfortable traveling with the human-powered vehicle.

In accordance with a twentieth aspect of the present disclosure, the control system according to the eighteenth or nineteenth aspect is configured so that the electronic controller is configured to restrict actuation of at least one of a transmission device and an electric assist unit as the at least one component to limit shifting with the transmission device, decrease a transmission ratio of the human-powered vehicle, or decrease an assist force assisting in propulsion of the human-powered vehicle.

The control system in accordance with the twentieth aspect allows for comfortable traveling with the human-powered vehicle.

In accordance with a twenty-first aspect of the present disclosure, the control system according to any one of the first to twentieth aspects is configured so that the electronic controller is configured to show a sleep related condition of the at least one passenger at the passenger information on a display of the human-powered vehicle.

The control system in accordance with the twenty-first aspect shows information related to sleep of the passenger on the display device. This allows the driver to recognize that the passenger is sleeping. This allows for comfortable traveling with the human-powered vehicle.

In accordance with a twenty-second aspect of the present disclosure, in the control system according to any one of the first to twenty-first aspects, the electronic controller is configured to control the at least one component in accordance with the passenger information and information related to the driver.

The control system in accordance with the twenty-second aspect controls the component in accordance with the information related to the driver and the passenger. This allows for comfortable traveling with the human-powered vehicle.

In accordance with a twenty-third aspect of the present disclosure, the control device according to any one of the first to twenty-second aspects is configured so that the human-powered vehicle includes a detection device that detects the passenger information, and the electronic controller is configured to control the component in accordance with a detection result of the detection device.

The control device in accordance with the twenty-third aspect detects the passenger information and controls the component in accordance with the passenger information. This allows for comfortable traveling with the human-powered vehicle.

A detection device in accordance with a twenty-fourth aspect of the present disclosure is mounted on a human-powered vehicle that allows a driver driving the human-powered vehicle and a passenger differing from the driver to simultaneously ride the human-powered vehicle. The detection device detects passenger information related to the passenger.

The detection device in accordance with the twenty-fourth detects passenger information that affects driving of the human-powered vehicle. Thus, control can be executed in accordance with the passenger information. This allows for comfortable traveling with the human-powered vehicle.

In accordance with a twenty-fifth aspect of the present disclosure, the detection device according to the twenty-fourth aspect is provided on a saddle of the human-powered vehicle to detect the passenger information related to the passenger seated on a seat provided rearward from the saddle.

The detection device in accordance with the twenty-fifth aspect detects the passenger information related to the passenger located outside the field of view of the driver. Thus, control is executed in accordance with the driver information. This allows for comfortable traveling with the human-powered vehicle.

In accordance with a twenty-sixth aspect of the present disclosure, the detection device according to a twenty-fourth or twenty-fifth aspect is provided rearward from a saddle of the human-powered vehicle.

The detection device in accordance with the twenty-sixth aspect detects the passenger information in a preferred manner.

In accordance with a twenty-seventh aspect of the present disclosure, the detection device according to any one of the twenty-fourth to twenty-sixth aspects comprises a camera.

The detection device in accordance with the twenty-seventh aspect detects the passenger information in a preferred manner.

A control system in accordance with a twenty-eighth aspect of the present disclosure comprises a detection device and an electronic controller. The detection device is configured to detect towed vehicle information related to a towed vehicle of a human-powered vehicle. The electronic controller is configured to automatically control a shifting condition of a transmission device of the human-powered vehicle. The electronic controller is configured to change the shifting condition in accordance with the towed vehicle information.

The control system in accordance with the twenty-eight aspect changes the shifting condition in accordance with information related to a towed vehicle. Thus, the transmission device can be controlled in accordance with the shifting condition. This allows for comfortable traveling with the human-powered vehicle.

In accordance with a twenty-ninth aspect, the control system according to the twenty-eighth aspect is configured so that the towed vehicle information includes at least one of information related to whether or not the towed vehicle is present, and information related to a passenger riding the towed vehicle.

The control system in accordance with the twenty-ninth aspect controls the transmission device in accordance with the shifting condition related to the towed vehicle. This allows for comfortable traveling with the human-powered vehicle.

The control system in accordance with the present disclosure allow for comfortable traveling with a human-powered vehicle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
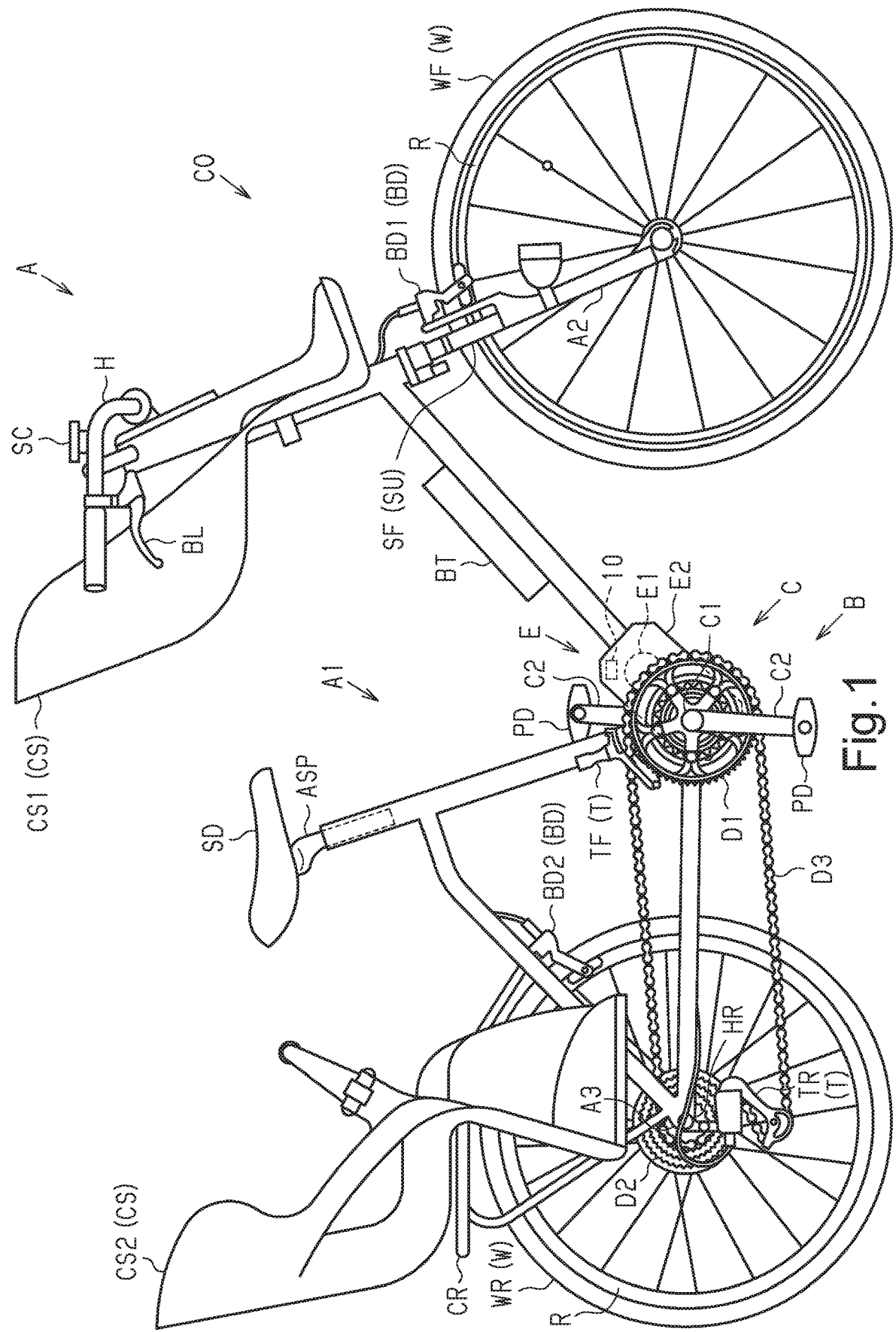
FIG. 1 is a side elevational view of a human-powered vehicle including a control system having a control device with an electronic controller in accordance with a first embodiment.

A human-powered vehicle A including a control device 10 will now be described with reference to FIG. 1. A human-powered vehicle refers to a vehicle that at least partially uses human force as a prime mover to travel and includes vehicles that assist human force with electric power. The human-powered vehicle does not include vehicles using only a prime mover that is not human force. In particular, the human-powered vehicle does not include vehicles that use only an internal combustion engine as the prime mover. A typical human-powered vehicle would be a small and light vehicle that can be driven on a public road without the need for a license to drive. The illustrated human-powered vehicle A is a bicycle including an electric assist unit E that uses electric energy to assist propulsion of the human-powered vehicle A. More specifically, the illustrated human-powered vehicle A is a city cycle. The human-powered vehicle A further includes a frame A1, a front fork A2, wheels W, a handlebar H, and a drive train B. The wheels W include a front wheel WF and a rear wheel WR.

The drive train B is of, for example, a chain-drive type. The drive train B includes a crank C, a front sprocket D1, a rear sprocket D2, and a chain D3. The crank C includes a crankshaft C1, rotatably supported by the frame A1, and two crank arms C2, respectively provided on the two ends of the crankshaft C1. A pedal PD is rotatably coupled to the distal end of each crank arm C2. The drive train B can be of any type such as a belt-drive type or a shaft-drive type.

The front sprocket D1 is provided on the crank C so as to rotate integrally with the crankshaft C1. The rear sprocket D2 is provided on a hub HU of the rear wheel WR. The chain D3 is wound around the front sprocket D1 and the rear sprocket D2. Human driving force applied to the pedals PD by a driver DR (refer to FIG. 2) driving the human-powered vehicle A is transmitted by the front sprocket D1, the chain D3, and the rear sprocket D2 to the rear wheel WR.

The human-powered vehicle A further includes components CO. The components CO include operated devices and a display device SC. The operated devices are electrically actuated in accordance with an input to an operation device mounted on the human-powered vehicle. The operated devices included in the components CO are actuated by electric power supplied from a battery BT mounted on the human-powered vehicle A or by electric power supplied from a dedicated power supply mounted on each component CO. In one example, the components CO include at least one of a transmission device T, a suspension SU, an adjustable seatpost ASP, an electric assist unit E, a brake device BD, and the display device SC. In the present embodiment, the components CO include the transmission device T. Operated device that are not included in the components CO can be configured to be mechanically actuated in accordance with inputs to operation devices. Elements that are not included in the components CO can be omitted from the human-powered vehicle A.

The transmission device T includes an external transmission. In one example, the transmission device T includes at least one of a front derailleur TF and a rear derailleur TR. The front derailleur TF is provided in the vicinity of the front sprocket D1. The front derailleur TF is driven to change the front sprocket D1 around which the chain D3 is wound and thereby change the transmission ratio of the human-powered vehicle A. The transmission ratio of the human-powered vehicle A is determined by the relationship of the number of teeth of the front sprocket D1 and the number of teeth of the rear sprocket D2. In one example, the transmission ratio of the human-powered vehicle A is determined by the ratio of the rotational speed of the rear sprocket D2 to the rotational speed of the front sprocket D1. That is, the transmission ratio of the human-powered vehicle A is determined by the ratio of the number of teeth of the front sprocket D1 to the number of teeth of the rear sprocket D2. The rear derailleur TR is provided on a rear end A3 of the frame A1. The rear derailleur TR is driven to change the rear sprocket D2 around which the chain D3 is wound and thereby change the transmission ratio of the human-powered vehicle A. In one example, the transmission device T is mechanically or electrically driven in accordance with the operation of a corresponding transmission operation device. The transmission device T can include an internal geared hub or a continuously variable transmission instead of the external transmission.

The suspension SU includes at least one of a rear suspension SF and a front suspension. The front suspension SF is actuated to absorb impact applied by the road surface to the front wheel WF. The rear suspension is actuated to absorb impact applied by the road surface to the rear wheel WR. In one example, the suspension SU is mechanically or electrically driven in accordance with the operation of a corresponding suspension operation device. More specifically, at least one of the position, the travel amount, the damping force, and the repulsion force of the suspension SU is changed in accordance with the operation of the corresponding suspension operation device.

The adjustable seatpost ASP is actuated to change the height of the saddle SD relative to the frame A1. In one example, the adjustable seatpost ASP is mechanically or electrically driven in accordance with the operation of an adjustable seatpost operation device.

The electric assist unit E is actuated to assist propulsion force of the human-powered vehicle A. The electric assist unit E is actuated in accordance with, for example, the human driving force applied to the pedals PD. The electric assist unit E includes, for example, an electric motor E1. The electric assist unit E is electrically driven in accordance with operation of an electric assist unit operation device.

The brake device BD includes brake devices BD, the number of which corresponds to the number of wheels W. In the present embodiment, the brake devices BD include a first brake device BD1 that brakes the front wheel WF of the human-powered vehicle A in accordance with a first operation and a second brake device BD1 that brakes a rear wheel WR of the human-powered vehicle A in accordance with a second operation. The two brake devices BD1 and BD2 have the same structure. The brake devices BD1 and BD2 are, for example, rim brake devices that brake rims R of the human-powered vehicle A. The brake devices BD1 and BD2 can be disc brake devices that brake disc brake rotors mounted on the human-powered vehicle A.

The first operation refers to, for example, the operation of one of the brake operation devices BL. One of the brake operation devices BL is provided on the right side of the handlebar H. In one example, the first brake device BD1 is mechanically or electrically driven in accordance with the first operation. The second operation refers to, for example, the operation of the other brake operation device BL. The other brake operation device BL is provided on the left side of the handlebar H. In one example, the second brake device BD2 is mechanically or electrically driven in accordance with the second operation.

The display device SC is provided on, for example, the handlebar H. In one example, the display device SC includes a cycle computer. The display device SC can include a smart device mounted on the human-powered vehicle A. The smart device includes at least one of a smartphone, a tablet-type computer, and a wearable device such as a smart watch.

Figure 2:
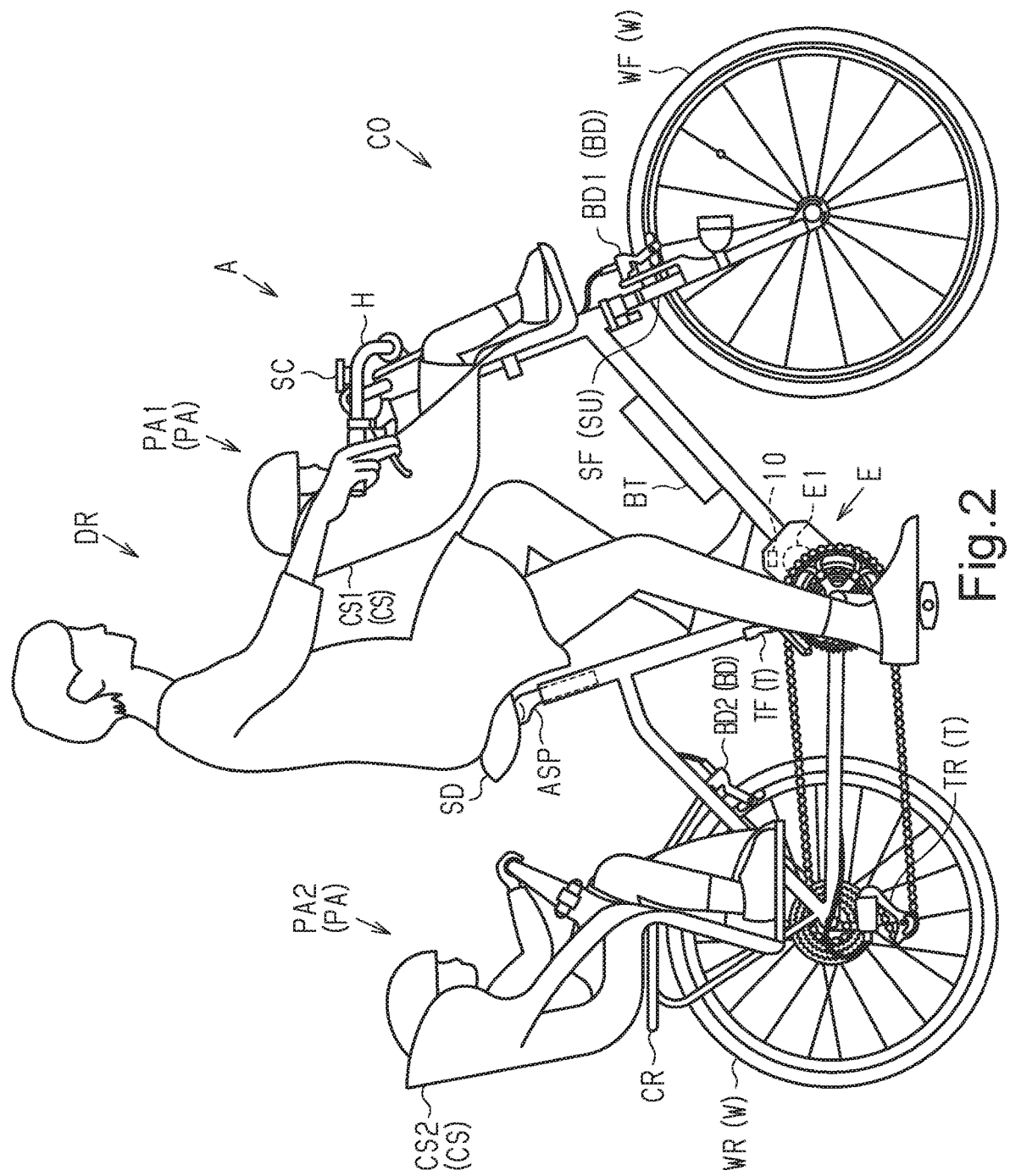
FIG. 2 is a side elevational view of the human-powered vehicle in a state in which a driver and passengers are riding the human-powered vehicle.

As shown in FIG. 2, the human-powered vehicle A in accordance with the present embodiment allows the driver DR driving the human-powered vehicle and a passenger PA differing from the driver DR to simultaneously ride the human-powered vehicle A. The driver DR drives the human-powered vehicle A, for example, in a state seated on a saddle SD. The human-powered vehicle A includes a seat CS allowing the passenger PA to be seated. The seat CS includes at least one of a first seat CS1 provided frontward from the saddle SD of the human-powered vehicle A and a second seat CS2 provided rearward from the saddle SD.

The number of passengers PA that can ride the human-powered vehicle A corresponds to the number of the seats CS mounted on the human-powered vehicle A. In the present embodiment, the number of passengers PA is two. More specifically, the passengers PA include a first passenger PA1 seated on the first seat CS1 and a second passenger PA2 seated on the second seat CS2. The first seat CS1 is configured to allow the first passenger PA1 to be seated. The first seat CS1 is, for example, mounted on the human-powered vehicle A in a removable manner near the handlebar H. In one example, the first seat CS1 is configured to allow the first passenger PA1 to be seated between the handlebar H and the saddle SD in the fore-aft direction of the human-powered vehicle A. In the present embodiment, the first seat CS1 is a child seat. The second seat CS2 is configured to allow the second passenger PA2 to be seated. The second seat CS2 is, for example, mounted in a removable manner on a carrier CR of the human-powered vehicle A. In the present embodiment, the second seat CS2 is a child seat.

Figure 3:
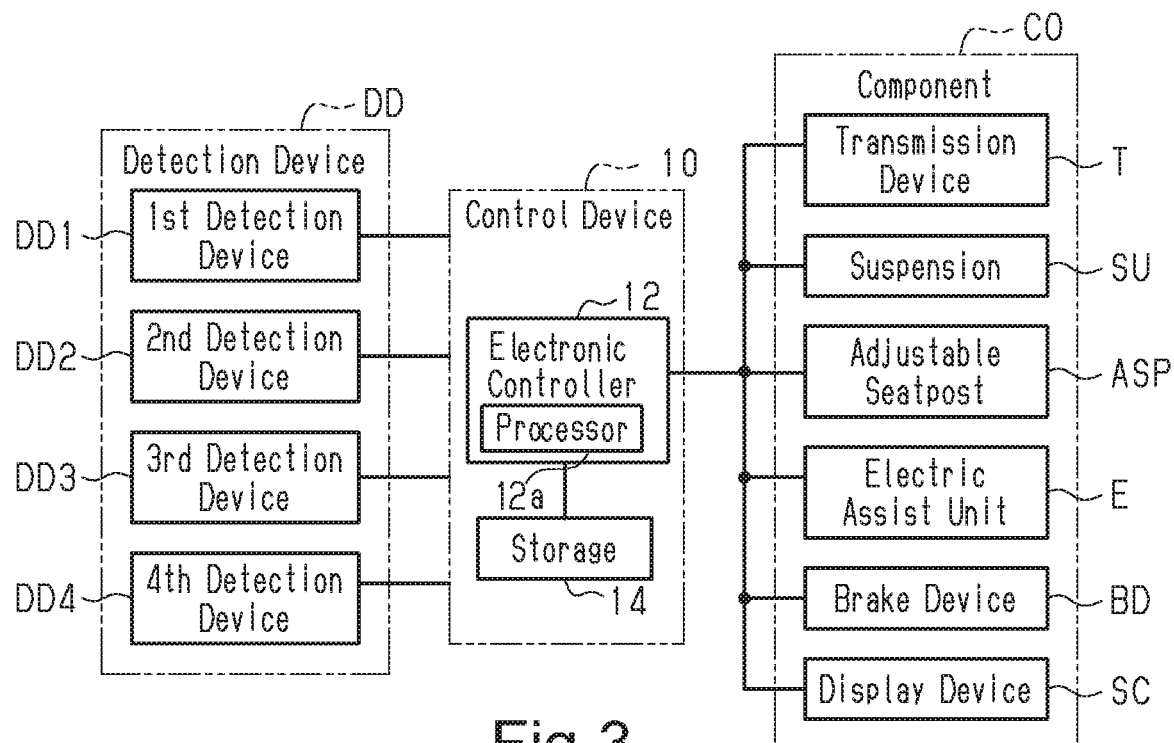
FIG. 3 is a block diagram showing the electrical connection of the control system illustrated in FIG. 1 with various elements.

With reference to FIG. 3, the configuration of a control device 10 will now be described in detail. The control device 10 is actuated by electric power supplied from the battery BT. The control device 10 is accommodated in, for example, a housing E2 of the electric assist unit E (refer to FIG. 1). The control device 10 includes an electronic controller 12 configured to control the component CO of the human-powered vehicle A that allows the driver driving the human-powered vehicle A and a passenger PA differing from the driver DR to simultaneously ride the human-powered vehicle A. The electronic controller 12 is formed of one or more semiconductor chips that are mounted on a circuit board. The term "electronic controller" as used herein refers to hardware that executes a software program, and does not include a human. The electronic controller 12 is a central processing unit (CPU) or a micro-processing unit (MPU) that includes at least one processor 12a. The control device 10 further includes storage 14 that stores various types of information. The storage 14 is any computer storage device or any non-transitory computer-readable medium with the sole exception of a transitory, propagating signal. For example, the storage 14 includes a nonvolatile memory and a volatile memory. The storage 14 stores, for example, various types of programs used for control and various types of preset information or the like. The electronic controller 12 can be one or more integrated circuits having firmware for causing the circuitry to complete the activities described herein. Of course, any number of other analog and/or digital components capable of performing the below described functionality can be provided in place of, or in conjunction with the described controller elements.

The electronic controller 12 is configured to control the components CO in accordance with passenger information IP related to the passenger PA. In one example, the electronic controller 12 is configured to control the components CO in accordance with passenger information IP related to the passenger PA seated on the seat CS. The passenger information IP includes at least one of information related to the first passenger PA1 seated on the first seat CS1 and information related to the second passenger PA2 seated on the second seat CS2. In one example, the electronic controller 12 is configured to control the transmission device T in accordance with both of the information related to the first passenger PA1 and the information related to the second passenger PA2. The electronic controller 12 is configured to change a control mode of the component CO in accordance with the passenger information IP. In the present embodiment, the electronic controller 12 is configured to change the control mode of the transmission device T in accordance with the passenger information IP. The electronic controller 12 can be configured to control an operated device in accordance with an input to an operation device mounted on the human-powered vehicle A.

The passenger information IP includes at least one of information related to whether or not the passenger PA is present, information related to the weight of the passenger PA, and information related to a condition of the passenger PA. The information related to whether or not the passenger PA is present includes at least one of information related to whether or not the first passenger PA1 is present and information related to whether or not the second passenger PA2 is present. The information related to the weight of the passenger PA includes at least one of information related to the weight of the first passenger PA1 and information related to the weight of the second passenger PA2. The information related to the weight of the passenger PA includes, for example, the weight acting on the seat CS. In one example, the information related to the weight of the passenger PA includes at least one of information related to the weight acting on the first seat CS1, information related to the weight acting on the second seat CS2, and information related to the sum of the weight acting on the first seat CS1 and the weight acting on the second seat CS2. The information related to the condition of the passenger PA includes at least one of information related to the condition of the first passenger PA1 and information related to the condition of the second passenger PA2.

The electronic controller 12 is configured to set a designated transmission ratio specifying a transmission ratio for starting movement of the human-powered vehicle A in accordance with the passenger information IP. In one example, the electronic controller 12 is configured to set a designated transmission ratio specifying a transmission ratio for starting movement of the human-powered vehicle A in accordance with whether or not the passenger PA is present. The transmission ratio for starting movement of the human-powered vehicle A is the transmission ratio of the human-powered vehicle A for a case where the driver DR driving the human-powered vehicle A starts pedaling with the pedals PD. In other words, the transmission ratio for starting movement of the human-powered vehicle A is the transmission ratio of the human-powered vehicle A for a case where the crank C of the human-powered vehicle A starts to rotate. In another example, the transmission ratio for starting movement of the human-powered vehicle A is the transmission ratio of the human-powered vehicle A for a case where the human-powered vehicle A starts to move. In one example, the electronic controller 12 is configured to set the designated transmission ratio so that the transmission ratio for starting movement of the human-powered vehicle A becomes equal to a reference transmission ratio in a case where the passenger PA is not seated on the seat CS or in a case where the seat CS is not mounted on the human-powered vehicle A. The reference transmission ratio is, for example, set in advance based on a transmission ratio that allows the driver DR to stably start moving the human-powered vehicle A. In the present embodiment, the electronic controller 12 is configured to control the transmission device T of the human-powered vehicle A so that the transmission ratio for starting movement of the human-powered vehicle A becomes equal to the designated transmission ratio.

The electronic controller 12 is configured to set the designated transmission ratio so that, for example, the transmission ratio for starting movement of the human-powered vehicle A is decreased in a case where a first predetermined condition is satisfied. In one example, the electronic controller 12 determines that the first predetermined condition is satisfied in a case where the first passenger PA1 is seated on the first seat CS1 and the second passenger PA2 is not seated on the second seat CS2. In other words, the electronic controller 12 sets the designated transmission ratio so that the transmission ratio for starting movement of the human-powered vehicle A is decreased in a case where the first passenger PA1 is seated on the first seat CS1 and the second passenger PA2 is not seated on the second seat CS2. The electronic controller 12 is configured to set the designated transmission ratio so that the transmission ratio for starting movement of the human-powered vehicle A becomes equal to a first transmission ratio GR1 in a case where the first predetermined condition is satisfied. The first transmission ratio GR1 is less than the reference transmission ratio. The first transmission ratio GR1 can be equal to the reference transmission ratio.

The electronic controller 12 is configured to set the designated transmission ratio so that, for example, the transmission ratio for starting movement of the human-powered vehicle A is less in a case where a second predetermined condition is satisfied than a case where the first predetermined condition is satisfied. In one example, the electronic controller 12 determines that the second predetermined condition is satisfied in a case where the first passenger PA1 is not seated on the first seat CS1 and the second passenger PA2 is seated on the second seat CS2. In other words, the electronic controller 12 sets the designated transmission ratio so that the transmission ratio for starting movement of the human-powered vehicle A is less in a case where the first passenger PA1 is not seated on the first seat CS1 and the second passenger PA2 is seated on the second seat CS2 than a case where the first passenger PA1 is seated on the first seat CS1 and the second passenger PA2 is not seated on the second seat CS2. In the present embodiment, the electronic controller 12 is configured to set the designated transmission ratio so that the transmission ratio for starting movement of the human-powered vehicle A becomes equal to a second transmission ratio GR2 in a case where the second predetermined condition is satisfied. The second transmission ratio GR2 is less than the first transmission ratio GR1.

The electronic controller 12 is configured to set the designated transmission ratio so that, for example, the transmission ratio for starting movement of the human-powered vehicle A is less in a case where a third predetermined condition is satisfied than a case where the second predetermined condition is satisfied. In one example, the electronic controller 12 determines that the third predetermined condition is satisfied in a case where the first passenger PA1 is seated on the first seat CS1 and the second passenger PA2 is seated on the second seat CS2. In other words, the electronic controller 12 sets the designated transmission ratio so that the transmission ratio for starting movement of the human-powered vehicle A is less in a case where the first passenger PA1 is seated on the first seat CS1 and the second passenger PA2 is seated on the second seat CS2 than a case where the first passenger PA1 is not seated on the first seat CS1 and the second passenger PA2 is seated on the second seat CS2. In the present embodiment, the electronic controller 12 is configured to set the designated transmission ratio so that the transmission ratio for starting movement of the human-powered vehicle A becomes equal to a third transmission ratio GR3 in a case where the third predetermined condition is satisfied. The third transmission ratio GR3 is less than the second transmission ratio GR2. The third transmission ratio GR3 can be equal to the second transmission ratio GR2.

The human-powered vehicle A further includes a detection device DD that detects various types of information. In one example, the detection device DD is mounted on the human-powered vehicle A that allows the driver DR driving the human-powered vehicle A and a passenger PA differing from the driver DR to simultaneously ride the human-powered vehicle A. The detection device DD detects passenger information IP related to the passenger PA. The first detection device DD outputs various types of detected information to the electronic controller 12. The electronic controller 12 is configured to control the components CO in accordance with the detection result of the detection device DD. The control device 10, the components CO and the detection device DD form a control system of the human-powered vehicle A. This control system can also be referred to a human-powered vehicle control system.

The detection device DD includes at least one of a first detection device DD1, a second detection device DD2, a third detection device DD3, and a fourth detection device DD4. The first detection device DD1 is configured to detect information related to the weight of the first passenger PAL The first detection device DD1 includes, for example, a weight sensor. In one example, the first detection device DD1 is provided on the first seat CS1 on which the first passenger PA1 is seated. The electronic controller 12 obtains information related to whether or not the first passenger PA1 is present and the weight of the first passenger PA1 from the information detected by the first detection device DD1.

The second detection device DD2 is configured to detect information related to the condition of the first passenger PAL The second detection device DD2 includes, for example, a camera configured to capture an image of the upper body of the first passenger PA1 seated on the first seat CS1. In one example, the second detection device DD2 is provided on the handlebar H or the first seat CS1. The electronic controller 12 obtains information related to whether or not the first passenger PA1 is present and the condition of the first passenger PA1 from the information detected by the second detection device DD2.

The third detection device DD3 is configured to detect information related to the weight of the second passenger PA2. The third detection device DD3 includes, for example, a weight sensor. In one example, the third detection device DD3 is provided on the second seat CS2 on which the second passenger PA2 is seated. The electronic controller 12 obtains information related to whether or not the second passenger PA2 is present and the weight of the second passenger PA2 from the information detected by the third detection device DD3.

Figure 4:
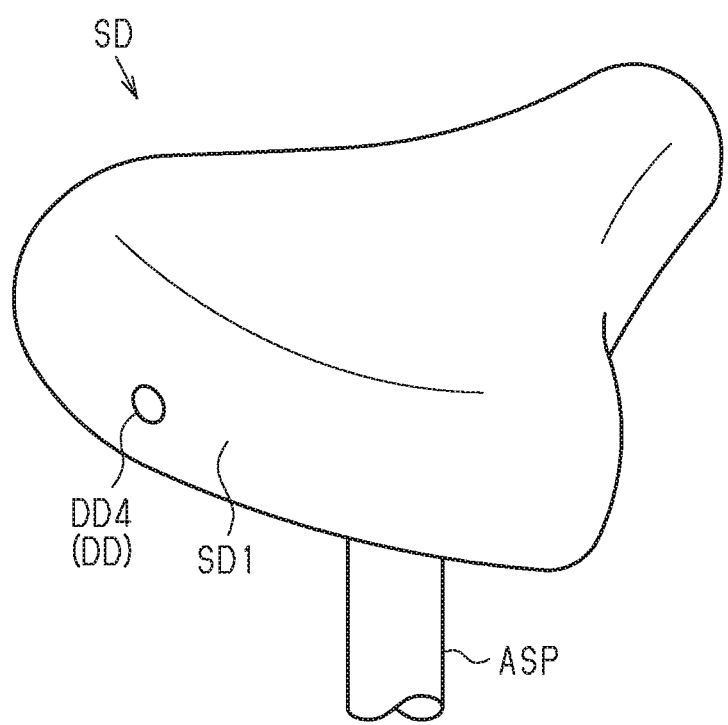
FIG. 4 is a perspective view of a saddle illustrated in FIG. 1.

As shown in FIG. 4, the fourth detection device DD4 is provided on the saddle SD of the human-powered vehicle A to detect the passenger information IP related to the passenger PA seated on the seat CS provided rearward from the saddle SD. The fourth detection device DD4 is configured to detect information related to the condition of the second passenger PA2. The fourth detection device DD4 includes, for example, a camera. In one example, the camera is configured to capture an image of the upper body of the second passenger PA2 seated on the second seat CS2. The fourth detection device DD4 is provided rearward from the saddle SD of the human-powered vehicle A. In one example, the fourth detection device DD4 is provided on a rear surface SD1 of the saddle SD. In the example shown in FIG. 1, the fourth detection device DD4 is located at the middle of the rear surface SD1 of the saddle SD with respect to the left-right direction of the human-powered vehicle A. The electronic controller 12 obtains information related to whether or not the second passenger PA2 is present and the condition of the second passenger PA2 from the information detected by the fourth detection device DD4. The fourth detection device DD4 can be provided on the second seat CS2 on which the second passenger PA2 is seated. Sensors that are not used to control the component CO can be omitted from the detection device DD of the human-powered vehicle A. In the present embodiment, one of the first detection device DD1 and the second detection device DD2 and one of the third detection device DD3 and the fourth detection device DD4 can be omitted from the human-powered vehicle A.

Figure 5:
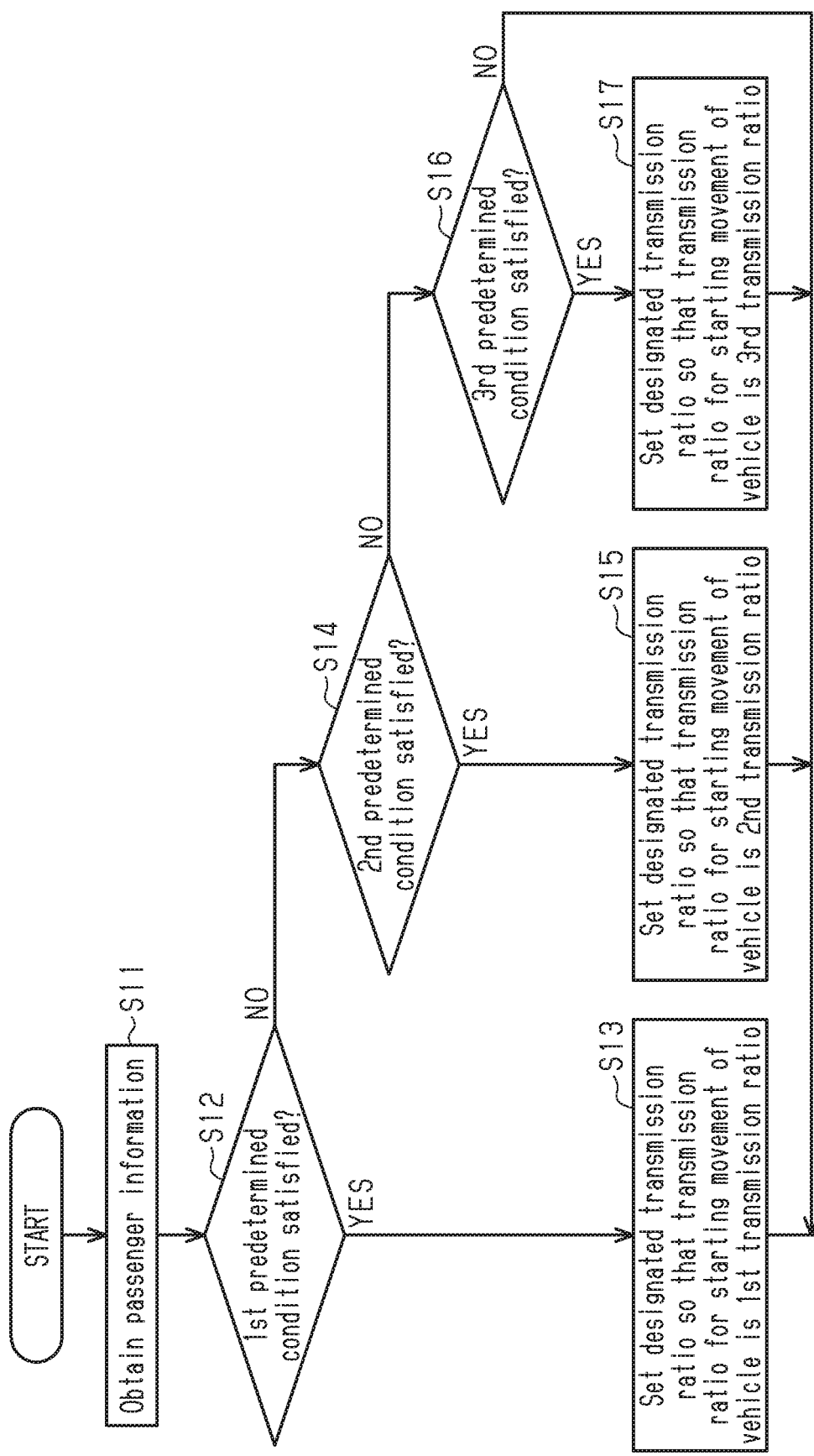
FIG. 5 is a flowchart showing one example of control executed by the electronic controller of the control device illustrated in FIG. 1.

With reference to FIG. 5, one example of a control executed by the control device 10 will now be described. In step S11, the electronic controller 12 obtains the passenger information IP from the detection device DD. More specifically, the electronic controller 12 obtains information related to whether or not the passenger PA is present from the detection device DD. In step S12, the electronic controller 12 determines whether or not the first predetermined condition is satisfied. In a case where the electronic controller 12 determines in step S12 that the first predetermined condition is satisfied, the electronic controller 12 proceeds to step S13. In step S13, the electronic controller 12 sets the designated transmission ratio so that the transmission ratio for starting movement of the human-powered vehicle A becomes equal to the first transmission ratio GR1.

In a case where the electronic controller 12 determines in step S12 that the first predetermined condition is not satisfied, the electronic controller 12 proceeds to step S14. In step S14, the electronic controller 12 determines whether or not the second predetermined condition is satisfied. In a case where the electronic controller 12 determines in step S14 that the second predetermined condition is satisfied, the electronic controller 12 proceeds to step S15. In step S15, the electronic controller 12 sets the designated transmission ratio so that the transmission ratio for starting movement of the human-powered vehicle A becomes equal to the second transmission ratio GR2.

In a case where the electronic controller 12 determines in step S14 that the second predetermined condition is not satisfied, the electronic controller 12 proceeds to step S16. In step S16, the electronic controller 12 determines whether or not the third predetermined condition is satisfied. In a case where the electronic controller 12 determines in step S16 that the third predetermined condition is not satisfied, the electronic controller 12 ends the present control. In a case where the electronic controller 12 determines in step S16 that the third predetermined condition is satisfied, the electronic controller 12 proceeds to step S17. In step S17, the electronic controller 12 sets the designated transmission ratio so that the transmission ratio for starting movement of the human-powered vehicle A becomes equal to the third transmission ratio GR3.

This ends the process from step S11 to step S17. The electronic controller 12 can, for example, repetitively execute the process from steps S11 to S17 or execute the process from steps S11 to S17 at a point of time in which the human-powered vehicle A starts to move. In the process from steps S11 to step S17 shown in FIG. 5, one or two of the combinations of steps S12 and S13, steps S14 and S15, and steps S16 and S17 can be omitted.

The driving performance of the driver DR decreases in a case where the passenger PA, who differs from the driver DR driving the human-powered vehicle A, rides the human-powered vehicle A. This is because the passenger PA increases the weight acting on the human-powered vehicle A and changes the center of mass of the human-powered vehicle A. It is desirable that the components CO of the human-powered vehicle A be controlled so that the driver DR driving the human-powered vehicle A can travel comfortably. The control device 10 in accordance with the present embodiment controls the component CO in accordance with the passenger information IP that affects driving of the human-powered vehicle A. This allows for comfortable traveling with the human-powered vehicle.

Second Embodiment

A control device 10 in accordance with a second embodiment will now be described with reference to FIG. 6. In the description hereafter, same reference numerals are given to those components that are the same as the corresponding components of the first embodiment. Such components will not be described in detail.

The electronic controller 12 is configured to control components CO in accordance with passenger information IP related to the passenger PA. In the present embodiment, the components CO include the brake devices BD. More specifically, in addition to the brake devices BD, the components CO can further include at least one of the transmission device T, the suspension SU, the adjustable seatpost ASP, the electric assist unit E, and the display device SC. In one example, the electronic controller 12 is configured to control the brake device BD in accordance with various types of the passenger information IP. In the present embodiment, the electronic controller 12 is configured to change the control mode of the brake devices BD in accordance with the passenger information IP.

The electronic controller 12 is configured to control the brake devices BD in accordance with the passenger information IP to change a relationship between a first ratio BR1 of an operation amount of a first operation and a braking force of the first brake device BD1 and a second ratio BR2 of an operation amount of a second operation and a braking force of the second brake device BD2. In one example, the electronic controller 12 is configured to control the brake devices BD in accordance with whether or not the passenger PA is present to change the relationship between the first ratio BR1 and the second ratio BR2. The first ratio BR1 sets the ratio of the braking force of the first brake device BD1 relative to the operation amount of the first operation. As the first ratio BR1 increases, the braking force acting on the front wheel WF increases relative to the operation amount of the first operation. As the first ratio BR1 decreases, the braking force acting on the front wheel WF decreases relative to the operation amount of the first operation. The second ratio BR2 sets the ratio of the braking force of the second brake device BD2 relative to the operation amount of the second operation. As the second ratio BR2 increases, the braking force acting on the rear wheel WR increases relative to the operation amount of the second operation. As the second ratio BR2 decreases, the braking force acting on the rear wheel WF decreases relative to the operation amount of the second operation. In one example, the electronic controller 12 is configured to control the brake devices BD so that the first ratio BR1 and the second ratio BR2 become equal to a reference ratio in a case where the passenger PA is not seated on the seat CS or in a case where the seat CS is not mounted on the human-powered vehicle A. The reference transmission ratio is, for example, set in advance based on a ratio that allows the driver DR to stably brake the human-powered vehicle A.

The electronic controller 12 is configured to control the brake devices BD so that, for example, the second ratio BR2 becomes greater than the first ratio BR1 in a case where the first predetermined condition is satisfied. In one example, the electronic controller 12 determines that the first predetermined condition is satisfied in a case where the first passenger PA1 is seated on the first seat CS1 and the second passenger PA2 is not seated on the second seat CS2. In other words, the electronic controller 12 controls the brake devices BD so that the second ratio BR2 becomes greater than the first ratio BR1 in a case where the first passenger PA1 is seated on the first seat CS1 and the second passenger PA2 is not seated on the second seat CS2. More specifically, the electronic controller 12 can be configured to control the brake devices BD so that the first ratio BR1 is maintained at the reference ratio and the second ratio BR2 becomes greater than the reference ratio or control the brake devices BD so that the second ratio BR2 is maintained at the reference ratio and the first ratio BR1 becomes less than the reference ratio.

The electronic controller 12 is configured to control the brake devices BD so that the first ratio BR1 becomes greater than the second ratio BR2 in a case where the second predetermined condition is satisfied. In one example, the electronic controller 12 determines that the second predetermined condition is satisfied in a case where the first passenger PA1 is not seated on the first seat CS1 and the second passenger PA2 is seated on the second seat CS2. In other words, the electronic controller 12 controls the brake devices BD so that the first ratio BR1 becomes greater than the second ratio BR2 in a case where the first passenger PA1 is not seated on the first seat CS1 and the second passenger PA2 is seated on the second seat CS2. More specifically, the electronic controller 12 can be configured to control the brake devices BD so that the second ratio BR2 is maintained at the reference ratio and the first ratio BR1 becomes greater than the reference ratio or control the brake devices BD so that the first ratio BR1 is maintained at the reference ratio and the second ratio BR2 becomes less than the reference ratio.

The electronic controller 12 is configured to control the brake devices BD so that, for example, the first ratio BR1 and the second ratio BR2 both become greater than the reference ratio in a case where the third predetermined condition is satisfied. In one example, the electronic controller 12 determines that the third predetermined condition is satisfied in a case where the first passenger PA1 is seated on the first seat CS1 and the second passenger PA2 is seated on the second seat CS2. In other words, the electronic controller 12 controls the brake devices BD so that the first ratio BR1 and the second ratio BR2 both become greater than the reference ratio in a case where the first passenger PA1 is seated on the first seat CS1 and the second passenger PA2 is seated on the second seat CS2.

Figure 6:
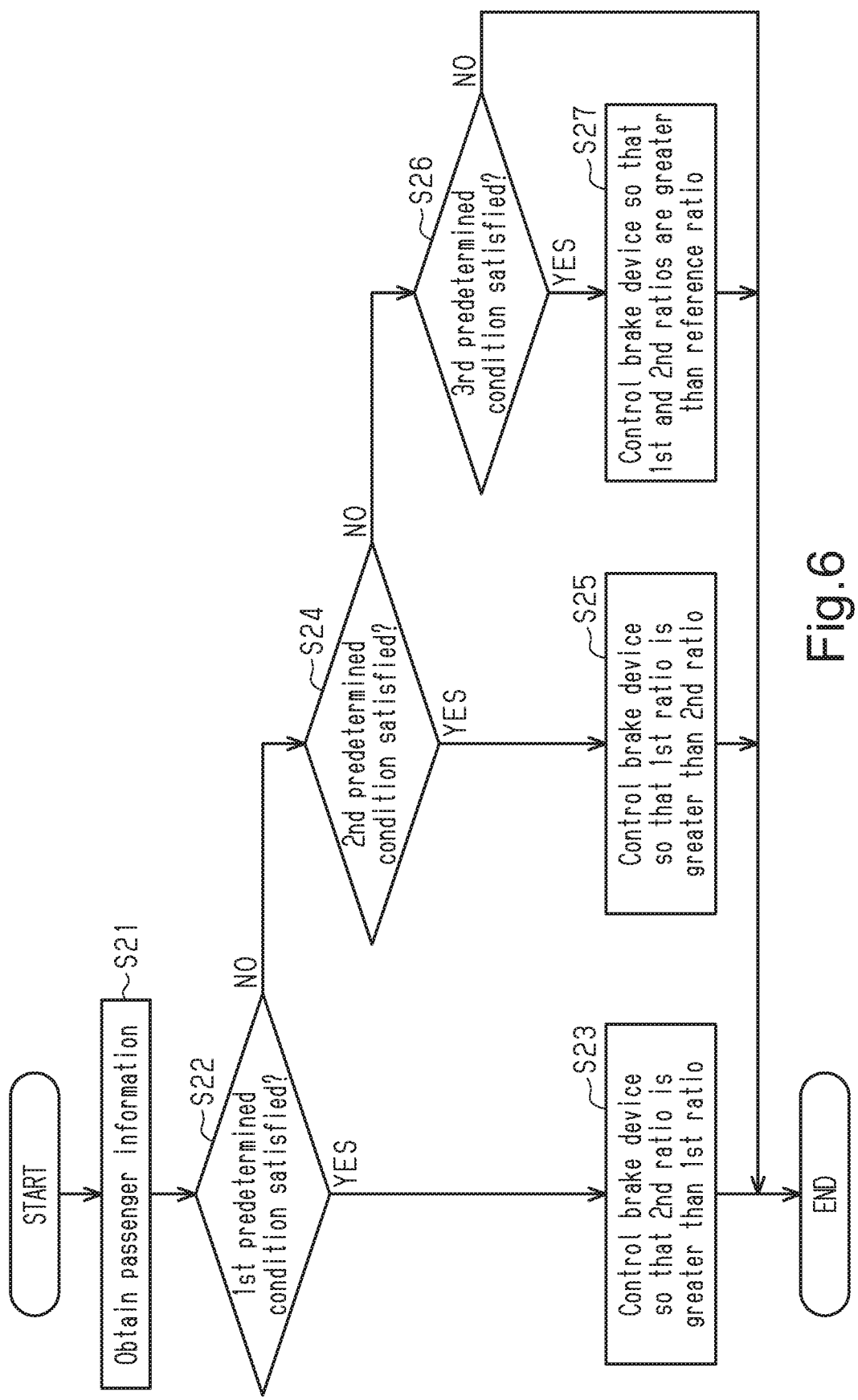
FIG. 6 is a flowchart showing one example of control executed by the electronic controller of the control device in accordance with a second embodiment.

With reference to FIG. 6, one example of a control executed by the control device 10 will now be described. In step S21, the electronic controller 12 obtains the passenger information IP from the detection device DD. More specifically, the electronic controller 12 obtains information related to whether or not the passenger PA is present from the detection device DD. In step S22, the electronic controller 12 determines whether or not the first predetermined condition is satisfied. In a case where the electronic controller 12 determines in step S22 that the first predetermined condition is satisfied, the electronic controller 12 proceeds to step S23. In step S23, the electronic controller 12 controls the brake devices BD so that the second ratio BR2 becomes greater than the first ratio BR1.

In a case where the electronic controller 12 determines in step S22 that the first predetermined condition is not satisfied, the electronic controller 12 proceeds to step S24. In step S24, the electronic controller 12 determines whether or not the second predetermined condition is satisfied. In a case where the electronic controller 12 determines in step S24 that the second predetermined condition is satisfied, the electronic controller 12 proceeds to step S25. In step S25, the electronic controller 12 is configured to control the brake devices BD so that the first ratio BR1 becomes greater than the second ratio BR2.

In a case where the electronic controller 12 determines in step S24 that the second predetermined condition is not satisfied, the electronic controller 12 proceeds to step S26. In step S26, the electronic controller 12 determines whether or not the third predetermined condition is satisfied. In a case where the electronic controller 12 determines in step S26 that the third predetermined condition is not satisfied, the electronic controller 12 ends the present control. In a case where the electronic controller 12 determines in step S26 that the second predetermined condition is satisfied, the electronic controller 12 proceeds to step S27. In step S27, the electronic controller 12 is configured to control the brake devices BD so that the first ratio BR1 and the second ratio BR2 both become greater than the reference ratio.

This ends the process from step S21 to step S27. The electronic controller 12 can, for example, repetitively execute the process from steps S21 to S27 or execute the process from steps S21 to S27 at a point of time in which the human-powered vehicle A starts to move. In the process from steps S21 to step S27 shown in FIG. 6, one or two of the combinations of steps S22 and S23, steps S24 and S25, and steps S26 and S27 can be omitted.

Third Embodiment

A control device 10 in accordance with a third embodiment will now be described with reference to FIG. 7. In the description hereafter, same reference numerals are given to those components that are the same as the corresponding components of the first embodiment. Such components will not be described in detail.

The electronic controller 12 is configured to control the components CO in accordance with passenger information IP related to the passenger PA. In the present embodiment, the components CO include the electric assist unit E. More specifically, in addition to the electric assist unit E, the components CO can further include at least one of the transmission device T, the suspension SU, the adjustable seatpost ASP, the brake devices BD, and the display device SC. In one example, the electronic controller 12 is configured to control the electric assist unit E in accordance with various types of the passenger information IP. In the present embodiment, the electronic controller 12 is configured to change the control mode of the electric assist unit E in accordance with the passenger information IP.

The electronic controller is configured to control the electric assist unit E so as to change an assist force assisting in propulsion of the human-powered vehicle A in accordance with the passenger information IP. In one example, the electronic controller is configured to control the electric assist unit E so as to change the assist force assisting in propulsion of the human-powered vehicle A in accordance with information related to the weight of the passenger PA. The electronic controller 12 can be configured to control the electric assist unit E so as to change the assist force assisting in propulsion of the human-powered vehicle A in accordance with whether or not the passenger PA is present. The assist force is the output of the electric motor E1 of the electric assist unit E. In one example, the electronic controller 12 is configured to control the electric assist unit E so that the assist force assisting in propulsion of the human-powered vehicle A becomes equal to a reference assist force that is in accordance with the human driving force in a case where the passenger PA is not seated on the seat CS or in a case where the seat CS is not mounted on the human-powered vehicle A. The reference assist force is, for example, set in advance based on an assist force that allows the driver DR to stably drive the human-powered vehicle A. The electronic controller 12 can be configured to control the electric assist unit E so as to change an assist ratio of the human-powered vehicle A in accordance with the passenger information IP. The assist ratio is the ratio of the human driving force and the output of the electric motor E1.

The electronic controller 12 is configured to control the electric assist unit E so as to increase the assist force assisting in propulsion of the human-powered vehicle A in a case where, for example, a fourth predetermined condition is satisfied. In one example, the electronic controller 12 determines that the fourth predetermined condition is satisfied in a case where the weight of the passenger PA is greater than or equal to a first predetermined weight PW1. In other words, the electronic controller 12 is configured to control the electric assist unit E so as to increase the assist force assisting in propulsion of the human-powered vehicle A in a case where the weight of the passenger PA is greater than or equal to the first predetermined weight PW1. More specifically, the electronic controller 12 is configured to control the electric assist unit E so that the assist force assisting in propulsion of the human-powered vehicle A becomes greater than the reference assist force. The weight of the passenger PA used in the fourth predetermined condition is, for example, the sum of the weight acting on the first seat CS1 and the weight acting on the second seat CS2.

The electronic controller 12 is configured to control the electric assist unit E so as to decrease the assist force assisting in propulsion of the human-powered vehicle A in a case where, for example, a fifth predetermined condition is satisfied. In one example, the electronic controller 12 determines that the fifth predetermined condition is satisfied in a case where the weight of the passenger PA is less than a second predetermined weight PW2. In other words, the electronic controller 12 is configured to control the electric assist unit E so as to decrease the assist force assisting in propulsion of the human-powered vehicle A in a case where the weight of the passenger PA is less than the second predetermined weight PW2. More specifically, the electronic controller 12 is configured to control the electric assist unit E so that the assist force assisting in propulsion of the human-powered vehicle V becomes equal to the reference assist force or so that the assist force assisting in propulsion of the human-powered vehicle A becomes greater than the reference assist force and less than the assist force of a case where the weight of the passenger PA is greater than or equal to the first predetermined weight PW1. The second predetermined weight PW2 is less than or equal to the first predetermined weight PW1. The weight of the passenger PA used in the fifth predetermined condition is, for example, the sum of the weight acting on the first seat CS1 and the weight acting on the second seat CS2.

Figure 7:
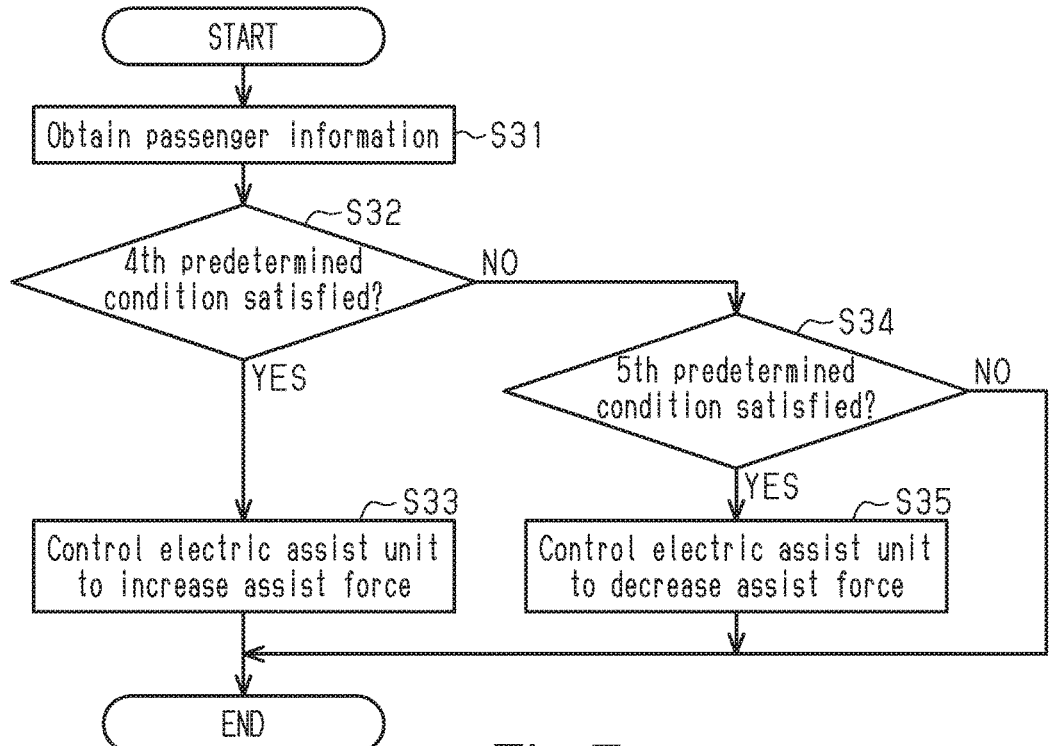
FIG. 7 is a flowchart showing one example of control executed by the electronic controller of the control device in accordance with a third embodiment.

With reference to FIG. 7, one example of a control executed by the control device 10 will now be described. In step S31, the electronic controller 12 obtains the passenger information IP from the detection device DD. More specifically, the electronic controller 12 obtains information related to the weight of the passenger PA from the detection device DD. In step S32, the electronic controller 12 determines whether or not the fourth predetermined condition is satisfied. In a case where the electronic controller 12 determines in step S32 that the fourth predetermined condition is satisfied, the electronic controller 12 proceeds to step S33. In step S33, the electronic controller 12 controls the electric assist unit E to increase the assist force assisting in propulsion of the human-powered vehicle A.

In a case where the electronic controller 12 determines in step S32 that the fourth predetermined condition is not satisfied, the electronic controller 12 proceeds to step S34. In step S34, the electronic controller 12 determines whether or not the fifth predetermined condition is satisfied. In a case where the electronic controller 12 determines in step S34 that the fifth predetermined condition is not satisfied, the electronic controller 12 ends the present control. In a case where the electronic controller 12 determines in step S34 that the fifth predetermined condition is satisfied, the electronic controller 12 proceeds to step S35. In step S35, the electronic controller 12 controls the electric assist unit E to decrease the assist force assisting in propulsion of the human-powered vehicle A.

This ends the process from step S31 to step S35. The electronic controller 12 can, for example, repetitively execute the process from steps S31 to S35 or execute the process from steps S31 to S35 at a point of time in which the human-powered vehicle A starts to move. In the process from steps S31 to step S35 shown in FIG. 6, one of the combinations of steps S32 and S33 and steps S34 and S35 can be omitted.

Fourth Embodiment

A control device 10 in accordance with a fourth embodiment will now be described with reference to FIG. 8. In the description hereafter, same reference numerals are given to those components that are the same as the corresponding components of the first embodiment. Such components will not be described in detail.

The electronic controller 12 is configured to control the components CO in accordance with passenger information IP related to the passenger PA. In the present embodiment, the components CO include at least one of the transmission device T, the electric assist unit E, and the display device SC. More specifically, in addition to the transmission device T, the electric assist unit E, and the display device SC, the components CO can further include at least one of the suspension SU, the adjustable seatpost ASP, and the brake devices BD. In one example, the electronic controller 12 is configured to control at least one of the transmission device T, the electric assist unit E, and the display device SC in accordance with various types of the passenger information IP. In the present embodiment, the electronic controller 12 is configured to change the control mode of at least one of the transmission device T, the electric assist unit E, and the display device SC in accordance with the passenger information IP.

The components CO include at least one of the transmission device T and the electric assist unit E. The electronic controller 12 is configured to restrict actuation of the components CO in accordance with the passenger information IP. The passenger information IP includes information related to a condition of the passenger PA. In one example, the electronic controller 12 is configured to restrict actuation of the components CO in accordance with information related to the passenger PA. The restriction of actuation of the components CO includes limiting shifting with the transmission device T, decreasing a transmission ratio of the human-powered vehicle A, and decreasing an assist force assisting in propulsion of the human-powered vehicle A. Limiting shifting with the transmission device T means decreasing the shifting frequency of the transmission device T. In the present embodiment, the electronic controller 12 is configured to restrict actuation of the components CO so as to limit shifting with the transmission device T, decrease the transmission ratio of the human-powered vehicle A, or decrease the assist force assisting in propulsion of the human-powered vehicle A.

The electronic controller 12 is configured to restrict actuation of the components CO in a case where a sixth predetermined condition is satisfied. The information related to the condition of the passenger PA used in the sixth predetermined condition includes information related to motion of the passenger PA. In one example, the electronic controller 12 determines that the sixth predetermined condition is satisfied in a case where the motion of the passenger PA is greater than or equal to a predetermined motion. In other words, the electronic controller 12 is configured to restrict actuation of the components CO in a case where the motion of the passenger PA is greater than or equal to the predetermined motion. A case where the motion of the passenger PA is greater than or equal to the predetermined motion indicates that, for example, the motion of the passenger PA seated on the seat CS is large. In one example, if the motion of the passenger PA is greater than the predetermined motion, this indicates that a movement amount per unit time of the position of the head of the passenger PA captured by the cameras of the detection devices DD2 and DD4 is greater than or equal to a first movement amount. The electronic controller 12 can be configured to control the components CO so that actuation of the components CO is restricted in a case where the sixth predetermined condition is satisfied and then canceled in a case where the sixth predetermined condition is no longer satisfied.

The electronic controller 12 is configured to restrict actuation of the components CO in a case where a seventh predetermined condition is satisfied. The information related to the condition of the passenger PA used in the seventh predetermined condition includes information related to sleep of the passenger PA. In one example, the electronic controller 12 determines that the seventh predetermined condition is satisfied in a case where the passenger PA is sleeping in a state seated on the seat CS. In other words, the electronic controller 12 is configured to restrict actuation of the components CO in accordance with sleep of the passenger PA. In a case where the passenger PA is sleeping, for example, the motion of the passenger PA seated on the seat CS will be small. In one example, if the passenger PA is sleeping, a movement amount per unit time of the position of the head of the passenger PA captured by the cameras of the detection devices DD2 and DD4 will be less than a second movement amount. The second movement amount is less than the first movement amount. The electronic controller 12 can be configured to control a component CO so that actuation of the component CO is restricted in a case where the seventh predetermined condition is satisfied and then canceled in a case where the seventh predetermined condition is no longer satisfied.

The component CO includes the display device SC. The electronic controller 12 is configured to control the display device SC in accordance with the passenger information IP. The passenger information IP includes information related to a condition of the passenger PA. The information related to the condition of the passenger PA includes information related to sleep of the passenger PA. In one example, the electronic controller 12 is configured to show information related to sleep of the passenger PA on the display device SC. The information related to sleep of the passenger PA includes at least one of information indicating that the passenger PA is awake and information indicating that the passenger PA is asleep. The electronic controller 12 can be configured to show the information related to sleep of the passenger PA on the display device SC if the passenger PA is asleep or show the information related to sleep of the passenger PA when appropriate on the display device SC. In the present embodiment, the electronic controller 12 is configured to show the information related to sleep of the passenger PA on the display device SC in a case where the seventh predetermined condition is satisfied. In other words, the electronic controller 12 is configured to show the information related to sleep of the passenger PA on the display device SC in a case where the seventh predetermined condition is satisfied.

Figure 8:
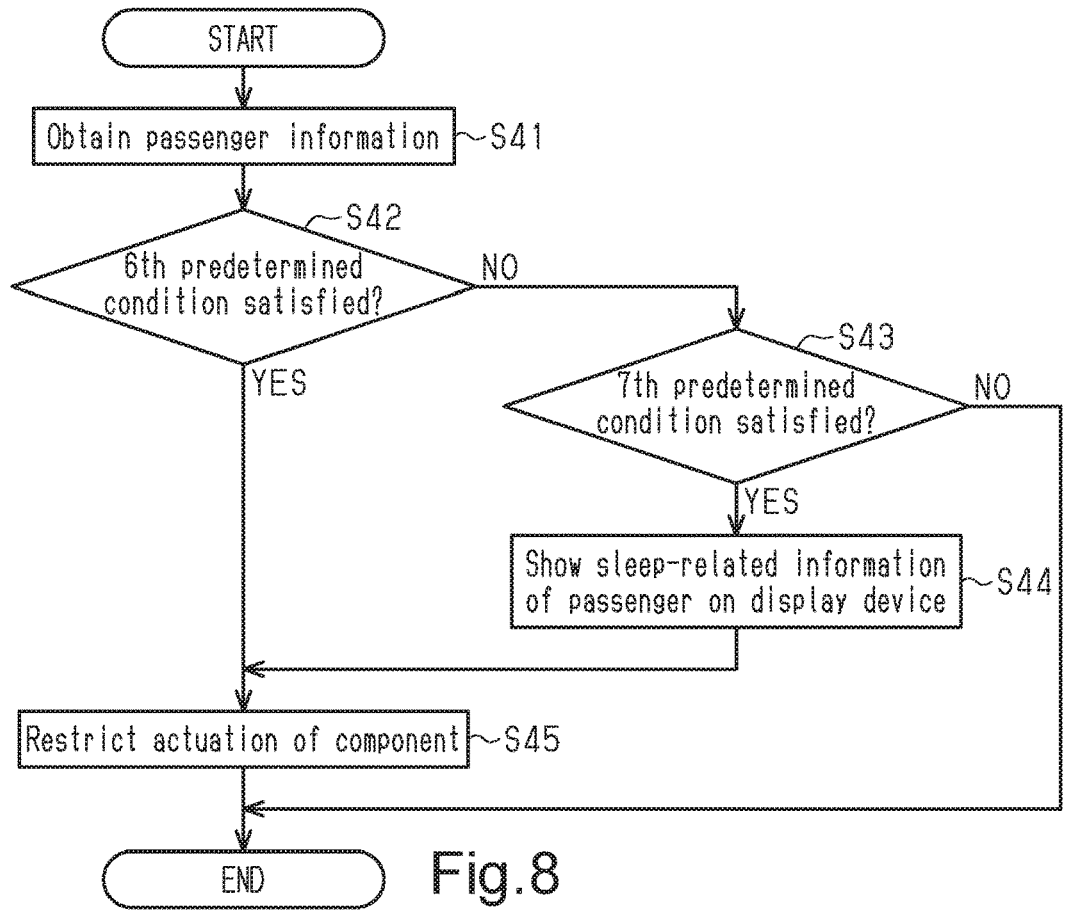
FIG. 8 is a flowchart showing one example of control executed by the electronic controller of the control device in accordance with a fourth embodiment.

With reference to FIG. 8, one example of a control executed by the control device 10 will now be described. In step S41, the electronic controller 12 obtains the passenger information IP from the detection device DD. More specifically, the electronic controller 12 obtains information related to the condition of the passenger PA from the detection device DD. In step S42, the electronic controller 12 determines whether or not the sixth predetermined condition is satisfied. In a case where the electronic controller 12 determines in step S42 that the sixth predetermined condition is satisfied, the electronic controller 12 proceeds to step S45. In a case where the electronic controller 12 determines in step S42 that the sixth predetermined condition is not satisfied, the electronic controller 12 proceeds to step S43.

In step S43, the electronic controller 12 determines whether or not the seventh predetermined condition is satisfied. In a case where the electronic controller 12 determines in step S43 that the seventh predetermined condition is not satisfied, the electronic controller 12 ends the present control. In a case where the electronic controller 12 determines in step S43 that the seventh predetermined condition is satisfied, the electronic controller 12 proceeds to step S44. In step S44, the electronic controller 12 shows sleep-related information of the passenger PA on the display device SC. In step S45, the electronic controller 12 restricts actuation of the components CO.

This ends the process from step S41 to step S45. The electronic controller 12, for example, repetitively executes the process from step S41 to S45. In the process from steps S41 to step S45 shown in FIG. 8, one, two, or three of step S42 to step S45 can be omitted as long as there are no contradictions.

Fifth Embodiment

A control device 10 in accordance with a fifth embodiment will now be described with reference to FIG. 9. In the description hereafter, same reference numerals are given to those components that are the same as the corresponding components of the first embodiment. Such components will not be described in detail.

The electronic controller 12 is configured to control the components CO in accordance with the passenger information IP and information related to the driver DR. The information related to the driver DR includes at least one of weight, gender, biological information, and the like of the driver DR. The biological information includes at least one of heart rate, myopotential, perspiration amount, and body temperature. The electronic controller 12 obtains the information related to the driver DR, for example, from various sensors mounted on the human-powered vehicle A or through an input to the display device SC.

The electronic controller 12 is configured to control the component CO in accordance with the passenger information IP in a case where, for example, an eighth predetermined condition is satisfied. In one example, the electronic controller 12 determines that the eighth predetermined condition is satisfied in a case where the electronic controller 12 estimates that the physical capability of the driver DR is less than or equal to a predetermined capability. More specifically, the electronic controller 12 determines that the eighth predetermined condition is satisfied in a case where at least one of first to sixth conditions is satisfied. The electronic controller 12 determines that the first condition is satisfied in a case where the weight of the passenger PA is greater than or equal to a third weight. The electronic controller 12 determines that the second condition is satisfied in a case where the gender of the passenger PA is female. The electronic controller 12 determines that the third condition is satisfied in a case where the heart rate of the passenger PA is greater than or equal to a predetermined heart rate. The electronic controller 12 determines that the fourth condition is satisfied in a case where the myopotential of the passenger PA is greater than or equal to a predetermined myopotential. The electronic controller 12 determines that the fifth condition is satisfied in a case where the perspiration amount of the passenger PA is greater than or equal to a predetermined perspiration amount. The electronic controller 12 determines that the sixth condition is satisfied in a case where the body temperature of the passenger PA is greater than or equal to a predetermined body temperature. The electronic controller 12 is configured to change control modes of the components CO in accordance with the passenger information IP based on whether or not the eighth predetermined condition is satisfied.

Figure 9:
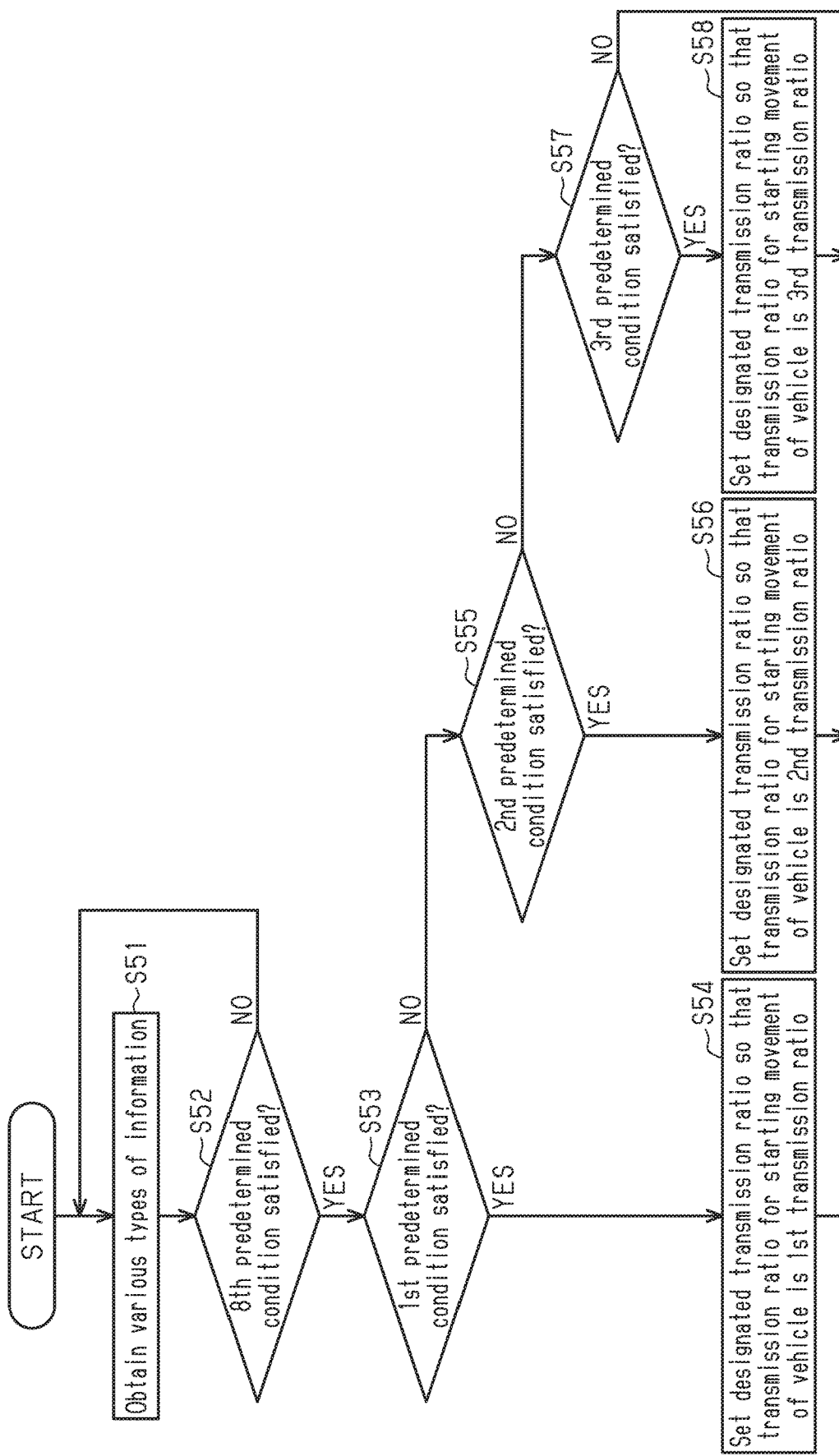
FIG. 9 is a flowchart showing one example of control executed by the electronic controller of the control device in accordance with a fifth embodiment.

With reference to FIG. 9, one example of a control executed by the control device 10 will now be described. In step S51, the electronic controller 12 obtains various types of information. More specifically, the electronic controller 12 obtains the passenger information IP and the information related to the driver DR. In step S52, the electronic controller 12 determines whether or not the eighth predetermined condition is satisfied. In a case where the electronic controller 12 determines in step S52 that the eighth predetermined condition is not satisfied, the electronic controller 12 returns to step S51. In a case where the electronic controller 12 determines that the eighth predetermined condition is satisfied, the electronic controller 12 proceeds to step S53. The electronic controller 12, for example, executes the process from step S12 to step S17 shown in FIG. 5 in the process of step S53 to step S58.

This ends the process from step S51 to step S58. The electronic controller 12 can, for example, repetitively execute the process from steps S51 to S58 or execute the process from steps S51 to S58 at a point of time in which the human-powered vehicle A starts to move. The process of step S51 and step S52 executed by the control device 10 in accordance with the fifth embodiment can be applied to any one of the second to fourth embodiments.

Sixth Embodiment

A control device 20 in accordance with a sixth embodiment will now be described with reference to FIGS. 10 to 13. In the description hereafter, same reference numerals are given to those components that are the same as the corresponding components of the first embodiment. Such components will not be described in detail.

Figure 10:
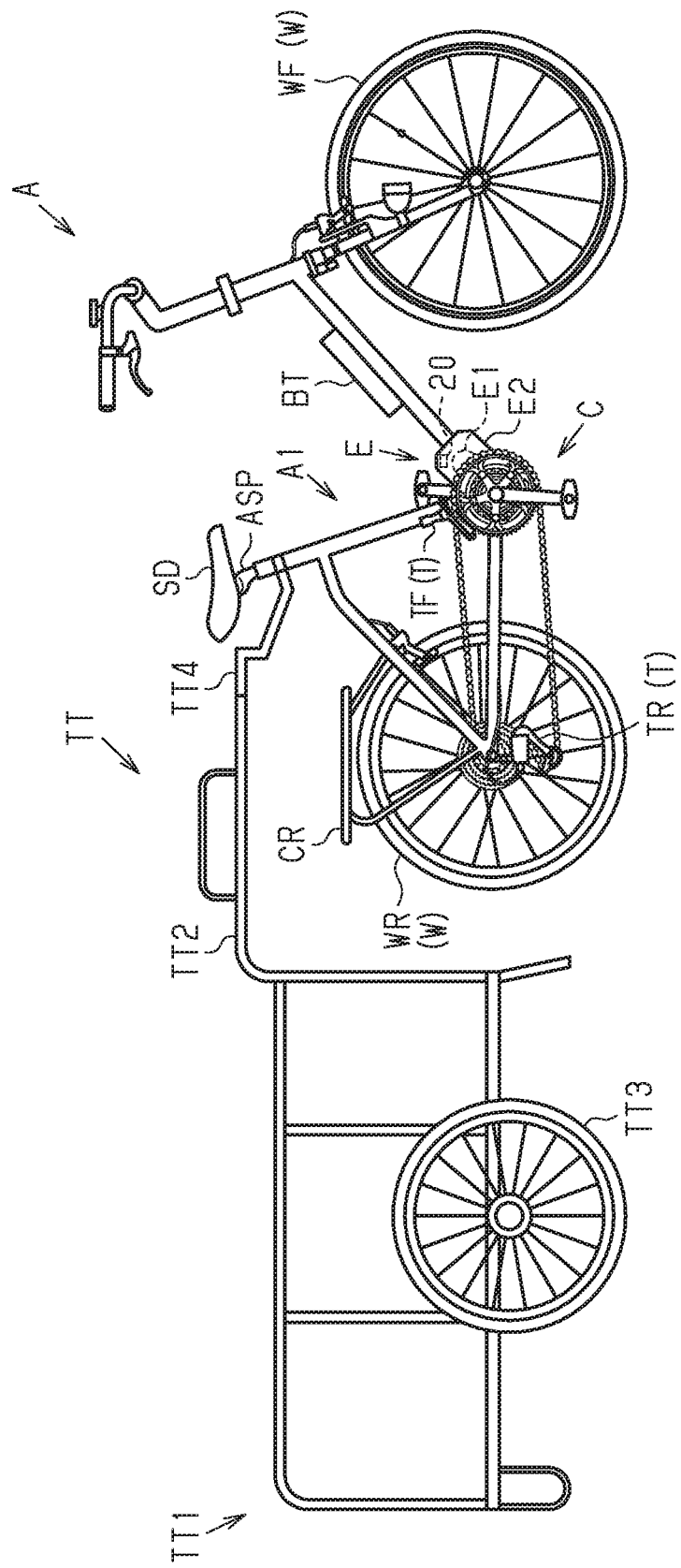
FIG. 10 is a side view of a human-powered vehicle including the electronic controller of the control device in accordance with a sixth embodiment and towing a towed vehicle.

A human-powered vehicle A including the control device 20 will now be described with reference to FIG. 10. The human-powered vehicle A of the present embodiment is configured to tow a towed vehicle TT. The towed vehicle TT is connected to, for example, the adjustable seatpost ASP of the human-powered vehicle A, a portion of the frame A1 supporting the adjustable seatpost ASP, or the carrier CR of the human-powered vehicle A. In the example shown in FIG. 10, the towed vehicle TT is connected to a portion of the frame A1 supporting the adjustable seatpost ASP. The seats CS shown in FIG. 1 are removed from the human-powered vehicle A shown in FIG. 10. The human-powered vehicle A can include the first seat CS1 that allows the first passenger PA1 to be seated.

The towed vehicle TT is connected to the human-powered vehicle A so as to be arranged, for example, rearward from the human-powered vehicle A. The towed vehicle TT includes a main body TT1, a pallet TT2, wheels TT3, and a tow TT4. The main body TT1 is configured to carry at least one of a person and cargo. The maximum payload of the main body TT1 is set based on the size of the main body TT1. The pallet TT2 is configured to carry cargo. The pallet TT2 is continuous with the main body TT1. The wheels TT3 are provided on the main body TT1. Preferably, the number of the wheels TT3 is two or more. The tow TT4 extends from, for example, the pallet TT2 and is connected to the human-powered vehicle A. The towed vehicle TT can be connected to the human-powered vehicle A so as to be arranged, for example, sideward from the human-powered vehicle A. The towed vehicle TT can be configured without the pallet TT2.

Figure 11:
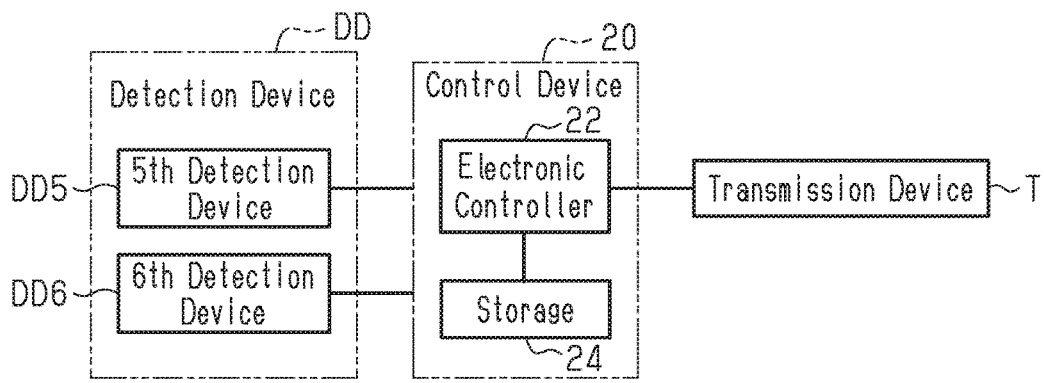
FIG. 11 is a block diagram showing the connection of the control device illustrated in FIG. 10 with various elements.

With reference to FIG. 11, the configuration of the control device 20 will now be described. The control device 20 is actuated by electric power supplied from the battery BT. The control device 20 is accommodated in, for example, the housing E2 of the electric assist unit E (refer to FIG. 10). The control device 20 includes an electronic controller 22 configured to control the transmission device T of the human-powered vehicle A in accordance with a shifting condition. The electronic controller 22 is a CPU or an MPU. The electronic controller 22 can be configured to control an operated device in accordance with an input to an operation device mounted on the human-powered vehicle A. The control device 20 further includes storage 24 that stores various types of information. The storage 24 includes a nonvolatile memory and a volatile memory. The storage 24 stores, for example, various types of programs used for control and various types of preset information or the like.

Figure 12:
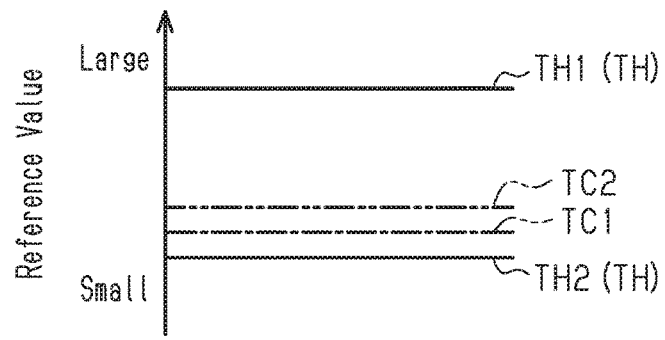
FIG. 12 is a map showing one example of a shifting condition used to control a transmission device illustrated in FIG. 10.

Referring to FIG. 12, the shifting condition is set based on a reference value RV and a threshold value TH of the human-powered vehicle A. The reference value RV includes, for example, traveling information related to the traveling state of the human-powered vehicle A. The traveling information includes at least one of cadence, torque applied to the human-powered vehicle A, vehicle speed, acceleration, and power. The power is the product of cadence and torque. The reference value RV is detected by, for example, various sensors mounted on the human-powered vehicle A. In one example, the reference value RV includes cadence.

The threshold value TH includes a first threshold value TH1 and a second threshold value TH2. The electronic controller 22 is configured to control the transmission device T so as to increase the transmission ratio of the human-powered vehicle A in accordance with the relationship of the reference value RV and the first threshold value TH1 and decrease the transmission ratio of the human-powered vehicle A in accordance with the relationship of the reference value RV and the second threshold value TH2. The first threshold value TH1 differs from the second threshold value TH2. In the present embodiment, the first threshold value TH1 is greater than the second threshold value TH2. In one example, the electronic controller 22 is configured to control the transmission device T so as to increase the transmission ratio of the human-powered vehicle A in a case where the reference value RV becomes greater than the first threshold value TH1 and decrease the transmission ratio of the human-powered vehicle A in a case where the reference value RV becomes less than the second threshold value TH2. In a case where the transmission ratio of the human-powered vehicle A is the maximum transmission ratio, the electronic controller 22 does not control the transmission device T to maintain the transmission ratio of the human-powered vehicle A even if the reference value RV becomes greater than the first threshold value TH1. The maximum transmission ratio is based on the relationship of the front sprocket D1 and the rear sprocket D2. In a case where the transmission ratio of the human-powered vehicle A is the minimum transmission ratio, the electronic controller 22 does not control the transmission device T to maintain the transmission ratio of the human-powered vehicle A even if the reference value RV becomes less than the second threshold value TH2.

The electronic controller 22 is configured to change the shifting condition in accordance with information related to the towed vehicle TT, which is towed by the human-powered vehicle A. In one example, the electronic controller 22 is configured to change the threshold value TH in accordance with information related to the towed vehicle TT. More specifically, the electronic controller 22 is configured to change at least one of the first threshold value TH1 and the second threshold value TH2 in accordance with information related to the towed vehicle TT. The information related to the towed vehicle TT includes at least one of information related to whether or not the towed vehicle is present, and information related to a passenger riding the towed vehicle TT. The information related to a passenger riding the towed vehicle TT includes at least one of information related to whether or not a passenger is present, information related to the number of passengers, and information related to the weight of the passenger. The information related to the weight of the passenger includes information related to the weight acting on the main body TT1 of the towed vehicle TT. The information related to the towed vehicle TT can include information related to the weight of the cargo carried by the towed vehicle TT. The electronic controller 22 can be configured to control the transmission device T to decrease the transmission ratio of the human-powered vehicle A in accordance with information related to the towed vehicle TT, which is towed by the human-powered vehicle A.

The electronic controller 22 is configured to change the shifting condition so that the second threshold value TH2, which determines the shifting condition, increases in a case where, for example, a ninth predetermined condition is satisfied. In other words, the electronic controller 22 is configured to change the shifting condition so that the second threshold value TH2 approaches the first threshold value TH1 in a case where the ninth predetermined condition is satisfied. In one example, the electronic controller 22 determines that the ninth predetermined condition is satisfied in a case where the towed vehicle TT is connected to the human-powered vehicle A and at least one of a person and cargo is not carried by the towed vehicle TT. In the present embodiment, the electronic controller 22 changes the shifting condition so that the second threshold value TH2, which determines the shifting condition, becomes equal to a first threshold value TC1 in a case where the ninth predetermined condition is satisfied. The single-dashed line in FIG. 12 indicates the first change threshold value TC1.

The electronic controller 22 is configured to change the shifting condition so that, for example, the second threshold value TH2, which determines the shifting condition, becomes further larger in a case where a tenth predetermined condition is satisfied than in a case where the ninth predetermined condition is satisfied. In other words, the electronic controller 22 is configured to change the shifting condition so that the second threshold value TH2 further approaches the first threshold value TH1 in a case where the tenth predetermined condition is satisfied. In one example, the electronic controller 22 determines that the tenth predetermined condition is satisfied in a case where at least one of seventh to tenth conditions is satisfied. The electronic controller 22 determines that the seventh condition is satisfied in a case where a passenger is riding the towed vehicle TT. The electronic controller 22 determines that the eighth condition is satisfied in a case where the number of passengers riding the towed vehicle TT is greater than or equal to a predetermined number. The electronic controller 22 determines that the ninth condition is satisfied in a case where the sum of the weight of the passengers riding the towed vehicle TT is greater than or equal to a fourth weight. The electronic controller 22 determines that the tenth condition is satisfied in a case where the weight of the cargo carried by the towed vehicle TT is greater than or equal to a fifth weight. In one example, the electronic controller 22 changes the shifting condition so that the second threshold value TH2, which determines the shifting condition, becomes equal to a second change threshold value TC2 in a case where the tenth predetermined condition is satisfied. The second change threshold value TC2 is greater than the first change threshold value TC1. The double-dashed line in FIG. 12 indicates the second change threshold value TC2.

As shown in FIG. 11, the human-powered vehicle A further includes the detection device DD that detects information related to the towed vehicle TT. The detection device DD outputs various types of detected information to the electronic controller 22. The electronic controller 22 is configured to change the shifting condition in accordance with the detection result of the detection device DD.

The detection device DD includes at least one of a fifth detection device DD5 and a sixth detection device DD6. The fifth detection device DD5 is configured to detect information related to the weight of the passenger riding the towed vehicle TT. The fifth detection device DD5 includes, for example, a weight sensor. In one example, the fifth detection device DD5 is provided on the main body TT1 of the towed vehicle TT, on which a passenger rides. The electronic controller 22 obtains information related to whether or not a passenger is present, information of the weight of the passenger, and information of the weight of the cargo carried by the towed vehicle TT.

Theسsixth detection device DD6 is configured to detect information related to the number of passengers riding the towed vehicle TT. The sixth detection device DD6 includes, for example, a camera configured to capture an image of the passenger riding the towed vehicle TT. In one example, the sixth detection device DD6 is provided on the pallet TT2 of the towed vehicle TT, the tow TT4 of the towed vehicle TT, the carrier CR of the human-powered vehicle A, or the like. The electronic controller 22 obtains information related to whether or not a passenger is present, and information related to the number of passengers based on the detected information from the sixth detection device DD6. Sensors that are not used for control related to the changing of the shifting condition can be omitted from the detection device DD of the human-powered vehicle A.

Figure 13:
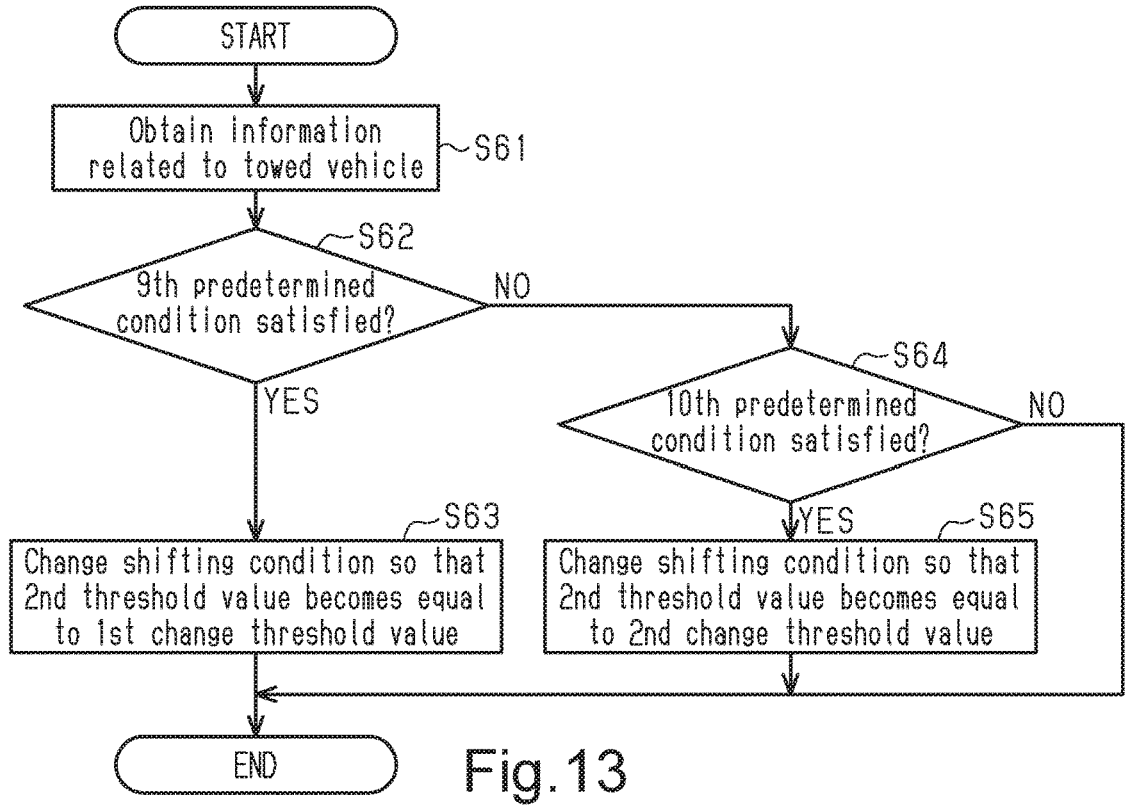
FIG. 13 is a flowchart showing one example of control executed by the electronic controller of the control device illustrated in FIG. 10.

With reference to FIG. 13, one example of a control executed by the control device 20 will now be described. In step S61, the electronic controller 22 obtains information related to the towed vehicle TT from the detection device DD. In step S62, the electronic controller 22 determines whether or not the ninth predetermined condition is satisfied. In a case where the electronic controller 22 determines in step S62 that the ninth predetermined condition is satisfied, the electronic controller 22 proceeds to step S63. In step S63, the electronic controller 22 changes the shifting condition so that the second threshold value TH2 becomes equal to the first change threshold value TC1.

In a case where the electronic controller 22 determines in step S62 that the ninth predetermined condition is not satisfied, the electronic controller 22 proceeds to step S64. In step S64, the electronic controller 22 determines whether or not the tenth predetermined condition is satisfied. In a case where the electronic controller 22 determines in step S64 that the tenth predetermined condition is not satisfied, the electronic controller 22 ends the present control. In a case where the electronic controller 22 determines in step S64 that the tenth predetermined condition is satisfied, the electronic controller 22 proceeds to step S65. In step S65, the electronic controller 22 changes the shifting condition so that the second threshold value TH2 becomes equal to the second change threshold value TC2.

This ends the process from step S61 to step S65. The electronic controller 22 can, for example, repetitively execute the process from steps S61 to S65 or execute the process from steps S61 to S65 at a point of time in which the human-powered vehicle A starts to move. In the process from steps S61 to step S65 shown in FIG. 13, one of the combinations of steps S62 and S63 and steps S64 and S65 can be omitted.

Modifications

The description related with the above embodiments exemplifies, without any intention to limit, applicable forms of a control device and a detection device according to the present disclosure. The control device and detection device according to the present disclosure is applicable to, for example, modifications of the above embodiments that are described below and combinations of at least two of the modifications that do not contradict each other. In the modifications described hereinafter, same reference numerals are given to those components that are the same as the corresponding components of the above embodiments. Such components will not be described in detail.

Figure 14:
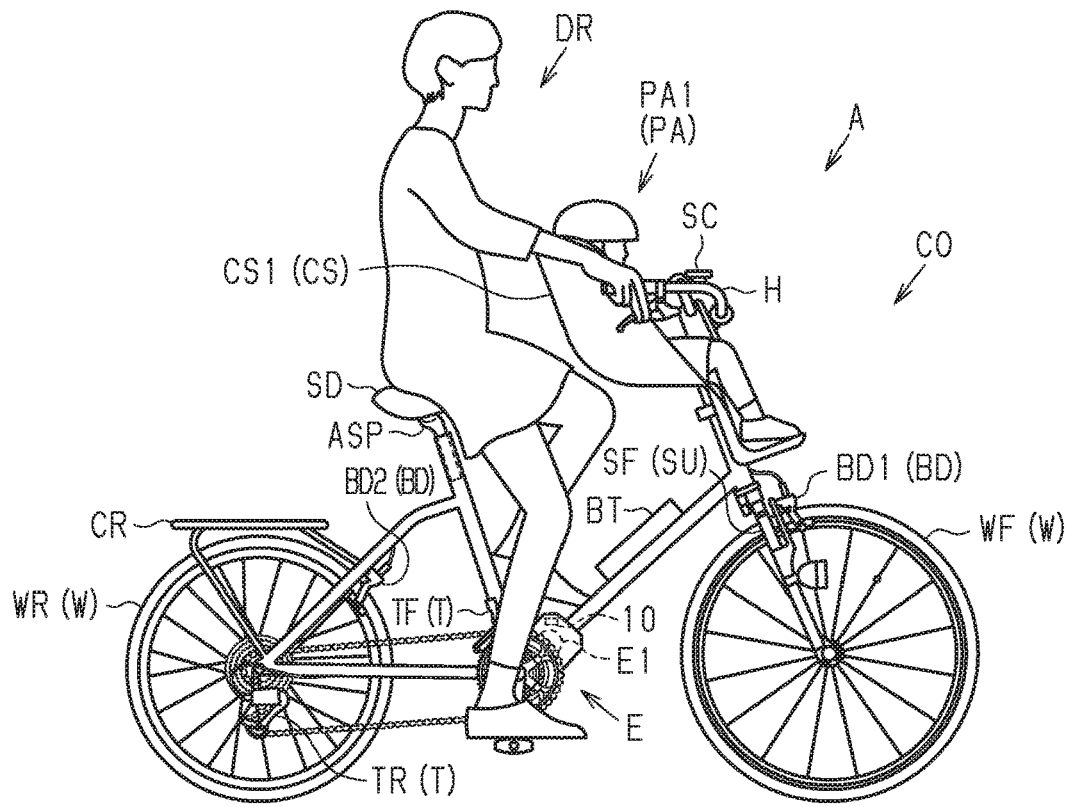
FIG. 14 is a side elevational view of a human-powered vehicle including a control system having a control device with an electronic controller in accordance with a modification.
Figure 15:
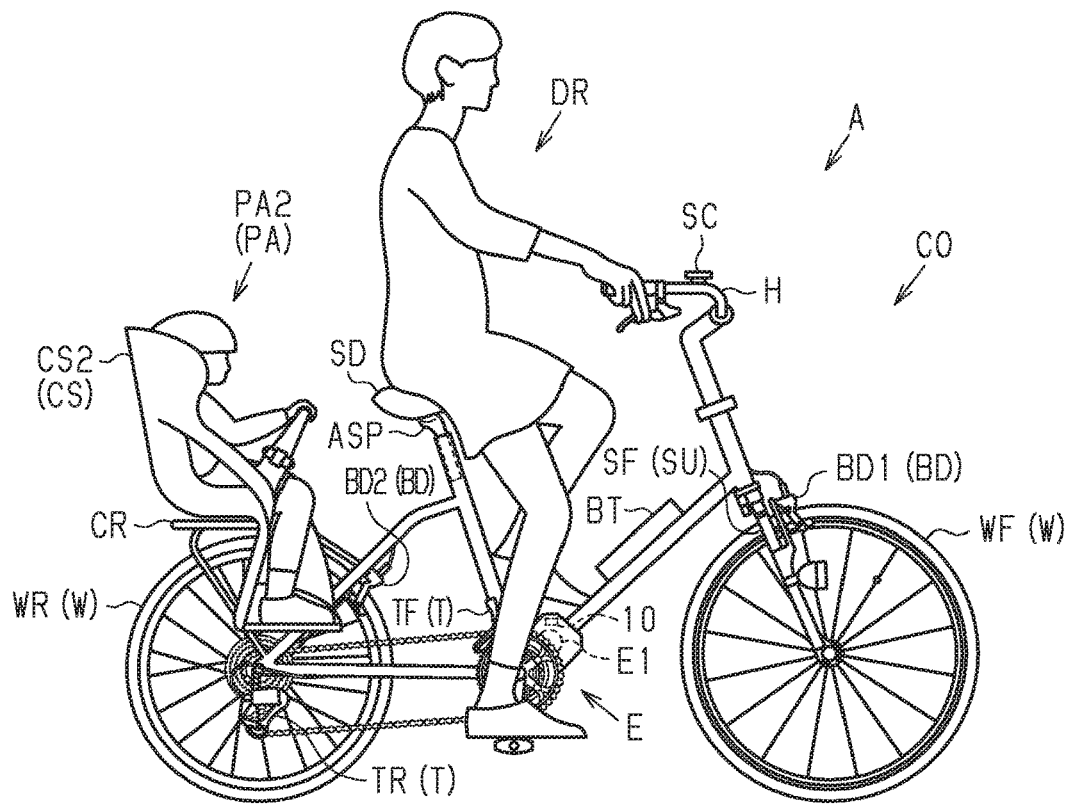
FIG. 15 is a side elevational view of a human-powered vehicle including a control system having a control device with an electronic controller in accordance with a modification.

The configuration of the seats CS mounted on the human-powered vehicle A in the first to fifth embodiments can be modified in any manner. In a first example, as shown in FIG. 14, the seat CS includes only the first seat CS1 provided frontward from the saddle SD of the human-powered vehicle A. In this case, the electronic controller 12 is configured to control the components CO in accordance with information related to the first passenger PA1 seated on the first seat CS1. In a second example, as shown in FIG. 15, the seat CS includes only the second seat CS2 provided rearward from the saddle SD of the human-powered vehicle A. In this case, the electronic controller 12 is configured to control the components CO in accordance with information related to the second passenger PA2 seated on the second seat CS2. In a third example, instead of or in addition to the first seat CS1, the seats CS further include a third seat provided frontward or rearward from the second seat CS2. The third seat is configured to allow a third passenger to be seated. The third seat can be formed integrally with the second seat or separately from the second seat. The third seat is attached in a removable manner to the carrier CR of the human-powered vehicle A. In the present embodiment, the second seat CS2 is a child seat. Instead of or in addition to the information related to the first passenger PA1 seated on the first seat CS1, the passenger information IP includes information related to the third passenger seated on the third seat.

In a fourth example, in addition to at least one of the first seat CS1 and the second seat CS2, the seats CS further include a fourth seat provided between the handlebar H and the front wheel WF in the fore-aft direction of human-powered vehicle A. In a case where the fourth seat is mounted on the human-powered vehicle A, open space for arrangement of the fourth seat is provided between the handlebar H and the front wheel WF in the fore-aft direction of the human-powered vehicle A. The fourth seat is configured to allow a fourth passenger to be seated. The fourth seat is attached in a removable manner to the frame connecting the handlebar H and the front wheel WF. The fourth seat is a child seat. The number of fourth passengers that can be seated on the fourth seat is one or more. In a case where the number of fourth passengers is more than one, it is preferred that a plurality of front wheels WF be mounted on the human-powered vehicle A. Instead of or in addition to the information related to the first passenger PA1 seated on the first seat CS1 and the information related to the second passenger PA2 seated on the second seat CS2, the passenger information IP includes information related to the fourth passenger seated on the fourth seat. In a case where two front wheels WF are mounted on the human-powered vehicle A, the fourth seat can be provided on the front wheels WF so as to be sandwiched between the two front wheels WF. In a fifth example, the seat CS is configured to allow a typical adult to be seated. In this case, the seat CS can be provided rearward from the saddle SD of the human-powered vehicle A or sideward from the human-powered vehicle A.

The configuration of the detection device DD can be changed in any manner in the first embodiment, the second embodiment, and the fifth embodiment. In a first example, the detection device DD includes a seventh detection device instead of the first detection device DD1 and the second detection device DD2. The seventh detection device is configured to detect information related to whether or not the first passenger PA1 is present. The seventh detection device includes, for example, a motion detector. In one example, the seventh detection device is provided on the first seat CS1 on which the first passenger PA1 is seated. The electronic controller 12 obtains information related to whether or not the first passenger PA1 is present from the information detected by the seventh detection device. The seventh detection device can include, for example, a seatbelt sensor related to a seatbelt provided on the first seat CS1. In this case, the seatbelt sensor detects at least one of a fastened state of the seatbelt and the length of the seatbelt. The seventh detection device can include, for example, a shape sensor related to the shape of the first seat CS1 in a case where the shape of the first seat CS1 is variable. In this case, the shape sensor detects whether or not the shape of the first seat CS1 is suitable for seating the first passenger PA1.

In a second example, the detection device DD includes an eighth detection device instead of the third detection device DD3 and the fourth detection device DD4. The eight detection device is configured to detect information related to whether or not the second passenger PA2 is present. The eighth detection device includes, for example, a motion detector. In one example, the eighth detection device is provided on the second seat CS2 on which the second passenger PA2 is seated. The electronic controller 12 obtains information related to whether or not the second passenger PA2 is present from the information detected by the eighth detection device. The eighth detection device can include, for example, a seatbelt sensor related to a seatbelt provided on the second seat CS2. In this case, the seatbelt sensor detects at least one of a fastened state of the seatbelt and the length of the seatbelt. The eighth detection device can include, for example, a shape sensor related to the shape of the second seat CS2 in a case where the shape of the second seat CS2 is variable. In this case, the shape sensor detects whether or not the shape of the second seat CS2 is suitable for seating the second passenger PA2.

The control subject of the electronic controller 12 can be changed in any manner in the first to fifth embodiments. In a first example, the component CO includes the suspension SU. More specifically, in addition to the suspension SU, the components CO can further include at least one of the transmission device T, the adjustable seatpost ASP, the electric assist unit E, the brake devices BD, and the display device SC. In one example, the electronic controller 12 is configured to control the suspension SU in accordance with various types of the passenger information IP. The electronic controller 12 is configured to change a control mode of the suspension SU in accordance with the passenger information IP.

The electronic controller 12 is configured to control the front suspension SF so as to increase damping of the impact applied by the road surface to the front wheel WF in a case where, for example, the first predetermined condition is satisfied. More specifically, the electronic controller 12 is configured to control the front suspension SF so as to unlock and actuate the front suspension SF or increase the travel amount of the front suspension SF in a case where the first predetermined condition is satisfied. In a case where the front suspension SF is locked, movement of the front wheel WF relative to the frame A1 is restricted. In a case where the front suspension SF is unlocked, the front wheel WF is movable relative to the frame A1. The electronic controller 12 is configured to control the rear suspension so as to increase damping of the impact applied by the road surface to the rear wheel WR in a case where, for example, the second predetermined condition is satisfied. More specifically, the electronic controller 12 is configured to control the rear suspension so as to unlock and actuate the rear suspension or increase the travel amount of the rear suspension in a case where the second predetermined condition is satisfied. In a case where the rear suspension is locked, movement of the rear wheel WR relative to the frame A1 is restricted. In a case where the rear suspension is unlocked, the rear wheel WR is movable relative to the frame A1. The electronic controller 12 is configured to control the suspension SU so as to increase damping of the impact applied by the road surface to the wheels W in a case where, for example, the third predetermined condition is satisfied. More specifically, the electronic controller 12 is configured to control the front suspension SF and the rear suspension so as to increase damping of the impact applied by the road surface to the front wheel WF and the rear wheel WR in a case where, for example, the third predetermined condition is satisfied.

In a second example, the component CO includes the adjustable seatpost ASP. More specifically, in addition to the adjustable seatpost ASP, the components CO can further include at least one of the transmission device T, the suspension SU, the electric assist unit E, the brake devices BD, and the display device SC. In one example, the electronic controller 12 is configured to control the adjustable seatpost ASP in accordance with various types of the passenger information IP. The electronic controller 12 is configured to change a control mode of the adjustable seatpost ASP in accordance with the passenger information IP. The electronic controller 12 is configured to control the adjustable seatpost ASP so that the height of the saddle SD relative to the frame A1 become equals to a reference height in a case where the passenger PA is not seated on the seat CS or in a case where the seat CS is not mounted on the human-powered vehicle A. The reference height is, for example, set in advance based on the height of the saddle SD that allows the driver DR to stably drive the human-powered vehicle A.

The electronic controller 12 controls the adjustable seatpost ASP to increase the height of the saddle SD relative to the frame A1 in a case where, for example, the fourth predetermined condition is satisfied. More specifically, the electronic controller 12 controls the adjustable seatpost ASP so that the height of the saddle SD relative to the frame A1 becomes higher than the reference height. The electronic controller 12 controls the adjustable seatpost ASP to decrease the height of the saddle SD relative to the frame A1 in a case where, for example, the fifth predetermined condition is satisfied. More specifically, the electronic controller 12 controls the adjustable seatpost ASP so that the height of the saddle SD relative to the frame A1 becomes equal to the reference height or the height of the saddle SD relative to the frame A1 becomes higher than the reference height and lower than the height of the saddle SD set for a case where the weight of the passenger PA is greater than or equal to the first predetermined weight PW1.

The control contents of the electronic controller 12 can be changed in any manner in the first to fifth embodiments. In a first example, the electronic controller 12 sets the designated transmission ratio so that the transmission ratio for starting movement of the human-powered vehicle A is increased in a case where the first passenger PA1 is seated on the first seat CS1 and the second passenger PA2 is not seated on the second seat CS2. In a second example, the electronic controller 12 sets the designated transmission ratio so that the transmission ratio for starting movement of the human-powered vehicle A is larger in a case where the first passenger PA1 is not seated on the first seat CS1 and the second passenger PA2 is seated on the second seat CS2 than a case where the first passenger PA1 is seated on the first seat CS1 and the second passenger PA2 is not seated on the second seat CS2. In a third example, the electronic controller 12 sets the designated transmission ratio so that the transmission ratio for starting movement of the human-powered vehicle A is larger in a case where the first passenger PA1 is seated on the first seat CS1 and the second passenger PA2 is seated on the second seat CS2 than a case where the first passenger PA1 is not seated on the first seat CS1 and the second passenger PA2 is seated on the second seat CS2.

In a fourth example, the electronic controller 12 controls the brake devices BD so that the second ratio BR2 becomes less than the first ratio BR1 in a case where the first passenger PA1 is seated on the first seat CS1 and the second passenger PA2 is not seated on the second seat CS2. In a fifth example, the electronic controller 12 controls the brake devices BD so that the first ratio BR1 becomes less than the second ratio BR2 in a case where the first passenger PA1 is not seated on the first seat CS1 and the second passenger PA2 is seated on the second seat CS2. In a sixth example, the electronic controller 12 controls the brake devices BD so that the first ratio BR1 and the second ratio BR2 both become less than the reference ratio in a case where the first passenger PA1 is seated on the first seat CS1 and the second passenger PA2 is seated on the second seat CS2.

In a seventh example, the electronic controller 12 is configured to control the electric assist unit E so as to decrease the assist force assisting in propulsion of the human-powered vehicle A in a case where the weight of the passenger PA is greater than or equal to the first predetermined weight PW1. In an eighth example, the electronic controller 12 is configured to control the electric assist unit E so as to increase the assist force assisting in propulsion of the human-powered vehicle A in a case where the weight of the passenger PA is less than the second predetermined weight PW2. In a ninth example, the electronic controller 12 restricts turning of the handlebar H in a case where the human-powered vehicle A loses balance or in a case where the human-powered vehicle A is about to lose balance. The restriction on the turning of the handlebar H includes locking of the handlebar H to restrict turning. In one example, the electronic controller 12 locks the handlebar H to restrict turning in a case where the human-powered vehicle A loses balance or in a case where the human-powered vehicle A is about to lose balance.

The human-powered vehicle A can be of any type. In a first example, the human-powered vehicle A is a road bike, a mountain bike, a cross bike, a trekking bike, a cargo bike, or a recumbent bike. In a second example, the human-powered vehicle A is a kick scooter. The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

What is claimed is:

1. A control system comprising:
a detection device configured to detect passenger information related to at least one passenger of a human-powered vehicle driven by a driver of the human-powered vehicle in which the at least one passenger is different from the driver; and
an electronic controller configured to control at least one component of the human-powered vehicle in accordance with the passenger information, the electronic controller being further configured to change a control mode of the at least one component in accordance with the passenger information.

2. The control system according to claim 1, wherein
the passenger information includes at least one of information related to whether or not the passenger is present, information related to weight of the passenger, and information related to a condition of the passenger.

3. The control system according to claim 1, wherein
the electronic controller is configured to control the at least one component in accordance with the passenger information related to the at least one passenger seated on at least one passenger seat of the human-powered vehicle.

4. The control system according to claim 3, wherein
the passenger information includes at least one of information related to a first passenger seated on a first seat of the at least one passenger seat and information related to a second passenger seated on a second seat of the at least one passenger seat.

5. The control system according to claim 1, wherein
the electronic controller is configured to set a designated transmission ratio specifying a transmission ratio of a transmission device of the human-powered vehicle for starting movement of the human-powered vehicle in accordance with the passenger information.

6. The control system according to claim 1, wherein
the electronic controller is configured to control a transmission device of the human-powered vehicle as one of the in accordance with the passenger information related to the at least one passenger being seated on at least one passenger seat of the human-powered.

7. The control system according to claim 3, wherein
the passenger information includes at least one of information related to a first passenger of the at least one passenger seated on a first seat of the at least one passenger seat and information related to a second passenger of the at least one passenger seated on a second seat of the at least one passenger seat in which the first seat is provided frontward from a saddle of the human-powered vehicle and the second seat is provided rearward from the saddle.

8. The control system according to claim 7, wherein
the electronic controller is configured to set a designated transmission ratio specifying a transmission ratio of a transmission device of the human-powered vehicle so that the designated transmission ratio for starting movement of the human-powered vehicle is less in a case where the first passenger is not seated on the first seat and the second passenger is seated on the second seat than a case where the first passenger is seated on the first seat and the second passenger is not seated on the second seat.

9. The control system according to claim 1, wherein
the electronic controller is configured to control an electric assist unit of the human-powered vehicle so as to decrease an assist force assisting in propulsion of the human-powered vehicle in accordance with a detected weight of the at least one passenger as the passenger information detected by the detection device in a case where the detected weight of the at least one passenger is less than a second predetermined weight.

10. The control system according to claim 1, wherein
the electronic controller is configured to control the at least one component in accordance with the passenger information and information related to the driver.

11. A control system, comprising:
a detection device configured to detect passenger information related to at least one passenger of a human-powered vehicle driven by a driver of the human-powered vehicle in which the at least one passenger is different from the driver; and
an electronic controller configured to control at least one component of the human-powered vehicle in accordance with the passenger information,
the at least one component includes at least one of a transmission device, a suspension, a brake device, and a display.

12. A control system, comprising:
a detection device configured to detect passenger information related to at least one passenger of a human-powered vehicle driven by a driver of the human-powered vehicle in which the at least one passenger is different from the driver; and
an electronic controller configured to control at least one component of the human-powered vehicle in accordance with the passenger information, the electronic controller further being configured to control a first brake device that brakes a front wheel of the human-powered vehicle in accordance with a first operation and a second brake device that brakes a rear wheel of the human-powered vehicle in accordance with a second operation as the at least one component in accordance with the passenger information to change a relationship between a first ratio of an operation amount of the first operation and a braking force of the first brake device and a second ratio of an operation amount of the second operation and a braking force of the second brake device.

13. The control system according to claim 12, wherein
the electronic controller is configured to control the first and second brake devices in accordance with the passenger information related to the at least one passenger being seated on at least one passenger seat of the human-powered vehicle.

14. The control system according to claim 13, wherein
the passenger information includes at least one of information related to a first passenger of the at least one passenger seated on a first seat and information related to a second passenger of the at least one passenger seated on a second seat in which the first seat is provided frontward from a saddle of the human-powered vehicle and the second seat is provided rearward from the saddle.

15. The control system according to claim 14, wherein
the electronic controller is configured to control the first and second brake devices so that the second ratio is greater than the first ratio in a case where the first passenger is seated on the first seat and the second passenger is not seated on the second seat.

16. The control system according to claim 14, wherein
the electronic controller is configured to control the first and second brake devices so that the first ratio is greater than the second ratio in a case where the first passenger is not seated on the first seat and the second passenger is seated on the second seat.

17. A control system, comprising:
a detection device configured to detect passenger information related to at least one passenger of a human-powered vehicle driven by a driver of the human-powered vehicle in which the at least one passenger is different from the driver; and
an electronic controller configured to control at least one component of the human-powered vehicle in accordance with the passenger information, the electronic controller further being configured to control an electric assist unit of the human-powered vehicle so as to increase an assist force assisting in propulsion of the human-powered vehicle in accordance with a detected weight of the at least one passenger as the passenger information detected by the detection device in a case where the detected weight of the at least one passenger is greater than or equal to a first predetermined weight.

18. A control system, comprising:
a detection device configured to detect passenger information related to at least one passenger of a human-powered vehicle driven by a driver of the human-powered vehicle in which the at least one passenger is different from the driver; and
an electronic controller configured to control at least one component of the human-powered vehicle in accordance with the passenger information, the electronic controller further being configured to restrict actuation of the at least one component in accordance with a detected motion of the passenger as the passenger information detected by the detection device in a case where the detected motion of the at least one passenger is greater than or equal to a predetermined motion.

19. A control system, comprising:
a detection device configured to detect passenger information related to at least one passenger of a human-powered vehicle driven by a driver of the human-powered vehicle in which the at least one passenger is different from the driver; and
an electronic controller configured to control at least one component of the human-powered vehicle in accordance with the passenger information, the electronic controller further being configured to restrict actuation of the component in accordance with a detected sleep related condition of the at least one passenger as the passenger information as detected by the detection device.

20. The control system according to claim 18, wherein the electronic controller is configured to restrict actuation of at least one of a transmission device and an electric assist unit as the at least one component to limit shifting with the transmission device, decrease a transmission ratio of the human-powered vehicle, or decrease an assist force assisting in propulsion of the human-powered vehicle.

21. A control system, comprising:
a detection device configured to detect passenger information related to at least one passenger of a human-powered vehicle driven by a driver of the human-powered vehicle in which the at least one passenger is different from the driver; and
an electronic controller configured to control at least one component of the human-powered vehicle in accordance with the passenger information, the electronic controller being further configured to show a sleep related condition of the at least one passenger at the passenger information on a display of the human-powered vehicle.

22. A control system comprising:
a detection device configured to detect towed vehicle information related to a towed vehicle of a human-powered vehicle; and
an electronic controller configured to automatically control a shifting condition of a transmission device of the human-powered vehicle by changing a threshold value used for determining the shifting condition,
the electronic controller being configured to change the shifting condition in accordance with the towed vehicle information.

23. The control system according to claim 22, wherein the towed vehicle information includes at least one of information related to whether or not the towed vehicle is present, and information related to a passenger riding the towed vehicle.

* * * * *